(12) United States Patent
Yamashita et al.

(10) Patent No.: US 10,272,926 B2
(45) Date of Patent: Apr. 30, 2019

(54) VEHICLE TRAVELING CONTROL APPARATUS

(71) Applicant: TOYOTA JIDOSHA KABUSHIKI KAISHA, Toyota-shi, Aichi (JP)

(72) Inventors: Keiji Yamashita, Nisshin (JP); Takeshi Inoguchi, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/711,609

(22) Filed: Sep. 21, 2017

(65) Prior Publication Data
US 2018/0093677 A1   Apr. 5, 2018

(30) Foreign Application Priority Data
Oct. 4, 2016   (JP) ................. 2016-196108

(51) Int. Cl.
| | |
|---|---|
| *B60W 10/04* | (2006.01) |
| *B60W 10/10* | (2012.01) |
| *B60W 10/18* | (2012.01) |
| *B60W 30/14* | (2006.01) |
| *B60W 50/08* | (2012.01) |
| *B60W 50/10* | (2012.01) |
| *B60W 50/14* | (2012.01) |
| *B60W 30/165* | (2012.01) |

(52) U.S. Cl.
CPC .......... *B60W 50/085* (2013.01); *B60W 10/04* (2013.01); *B60W 10/10* (2013.01); *B60W 10/18* (2013.01); *B60W 30/143* (2013.01); *B60W 30/165* (2013.01); *B60W 50/10* (2013.01); *B60W 50/14* (2013.01); *B60W 2050/146* (2013.01); *B60W 2420/42* (2013.01); *B60W 2420/52* (2013.01); *B60W 2520/105* (2013.01); *B60W 2550/22* (2013.01); *B60W 2550/302* (2013.01); *B60W 2550/308* (2013.01); *B60W 2710/182* (2013.01); *B60W 2720/10* (2013.01); *B60W 2750/308* (2013.01)

(58) Field of Classification Search
CPC .... B60W 50/085; B60W 50/10; B60W 50/14; B60W 10/04; B60W 30/143; B60W 2750/308; B60W 2720/10; B60W 2420/42; B60W 2550/22
See application file for complete search history.

(56) References Cited

U.S. PATENT DOCUMENTS

| | | | | |
|---|---|---|---|---|
| 6,895,324 | B2 * | 5/2005 | Straub ............... | B60K 31/0058 340/905 |
| 8,983,750 | B2 * | 3/2015 | Maruyama .......... | B60W 50/085 701/93 |
| 2018/0015920 | A1 * | 1/2018 | Schuberth ......... | B60W 50/0097 |

FOREIGN PATENT DOCUMENTS

JP    2012-224247 A    11/2012

* cited by examiner

*Primary Examiner* — Michael J Zanelli
(74) *Attorney, Agent, or Firm* — Oliff PLC

(57) ABSTRACT

When an accept operation for permitting a speed limit to be set as a target speed has been detected, a driving support ECU gradually increases the current target speed toward the current speed limit. The target speed is displayed in a gradual-change display screen on a display apparatus. A driver performs a correcting operation at the time at which the driver recognizes that the displayed target speed exceeds the speed limit. The driving support ECU corrects the target speed based on the correcting operation.

6 Claims, 13 Drawing Sheets

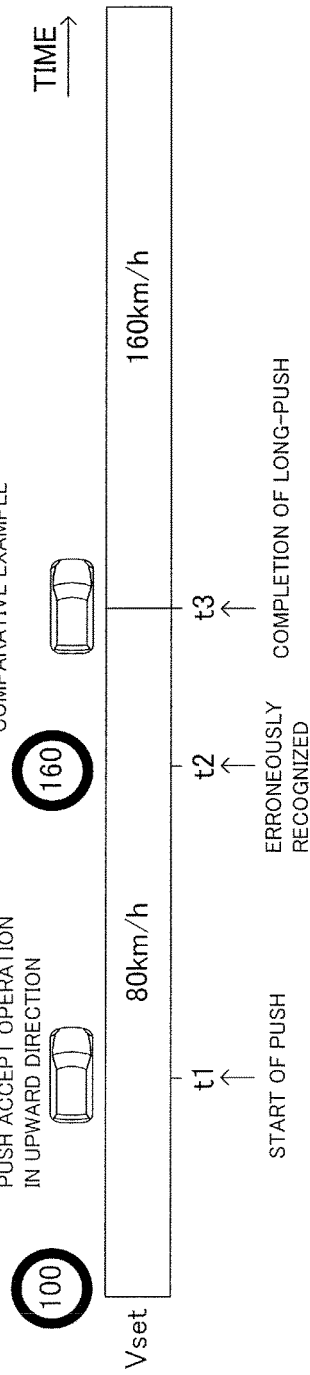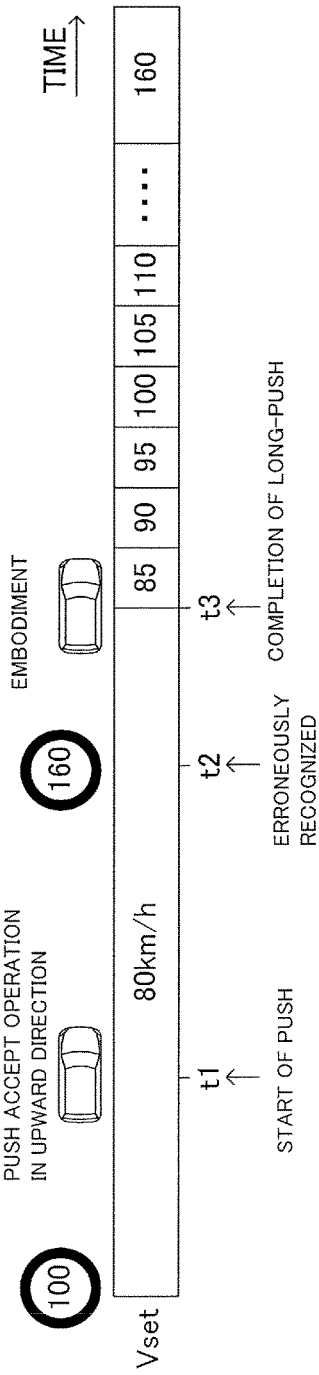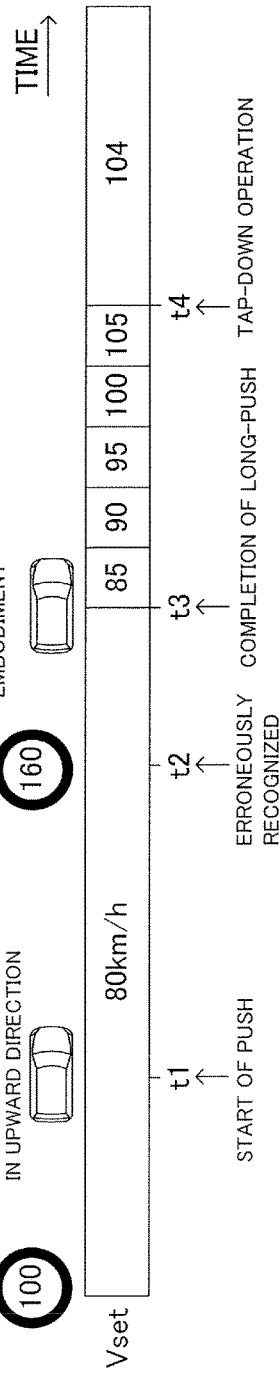

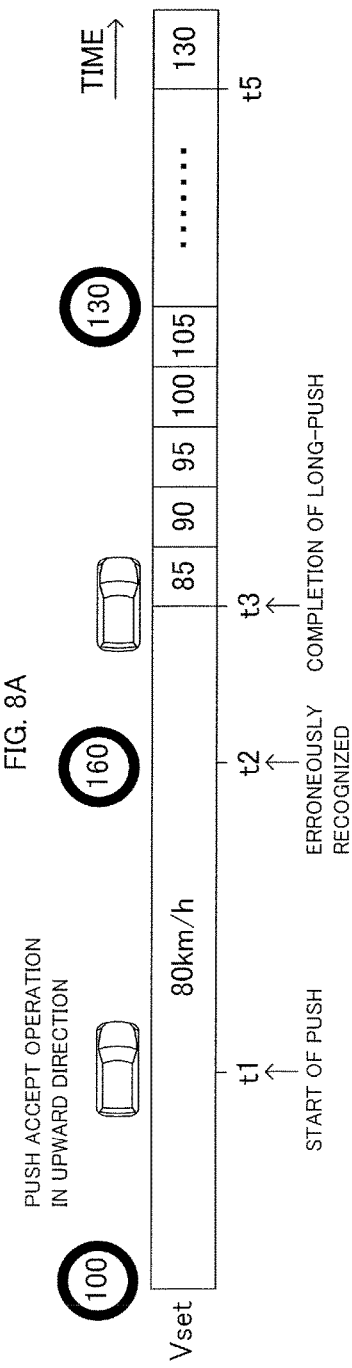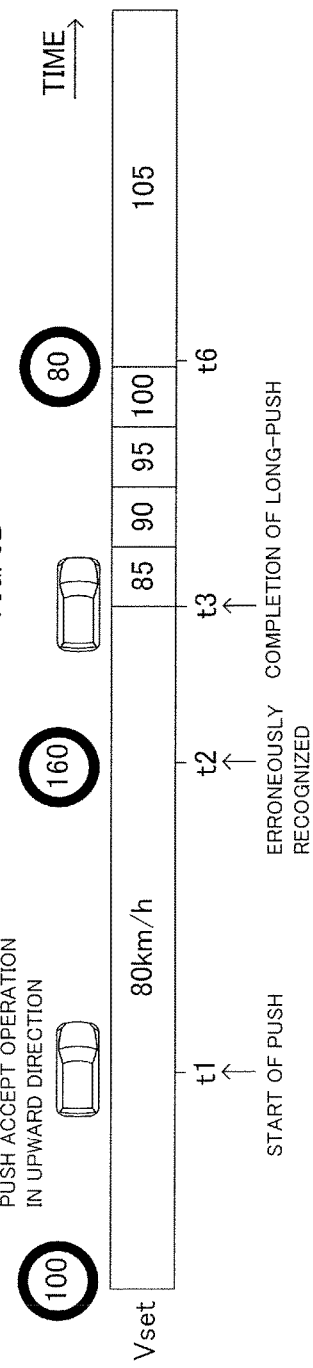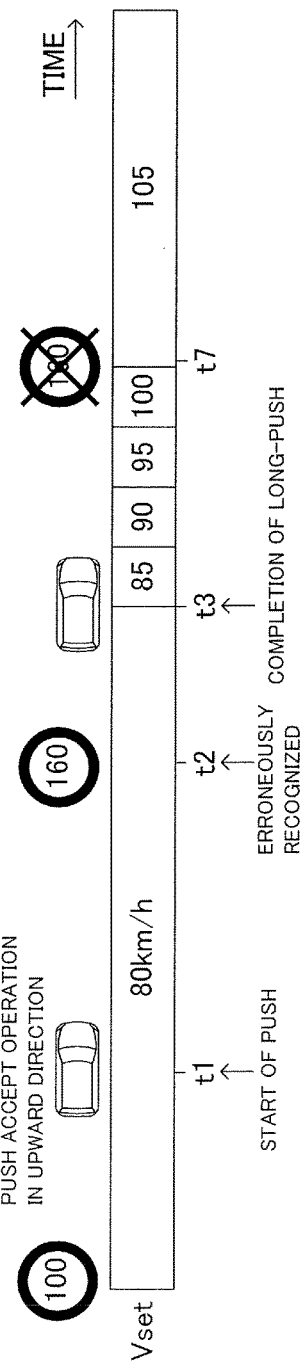

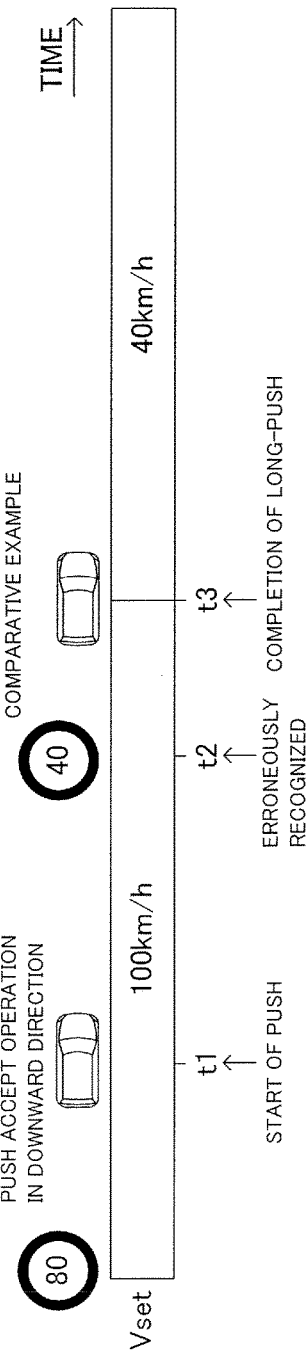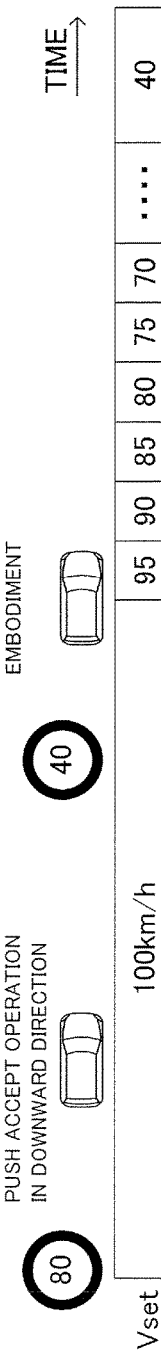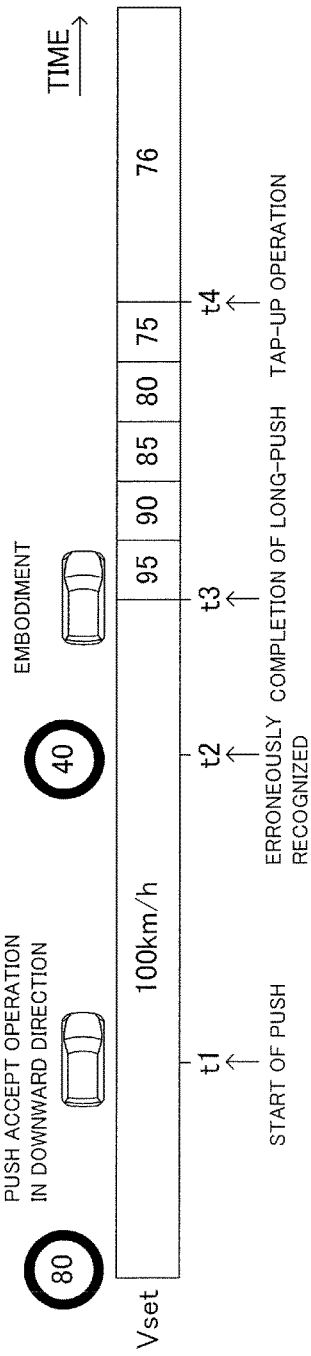

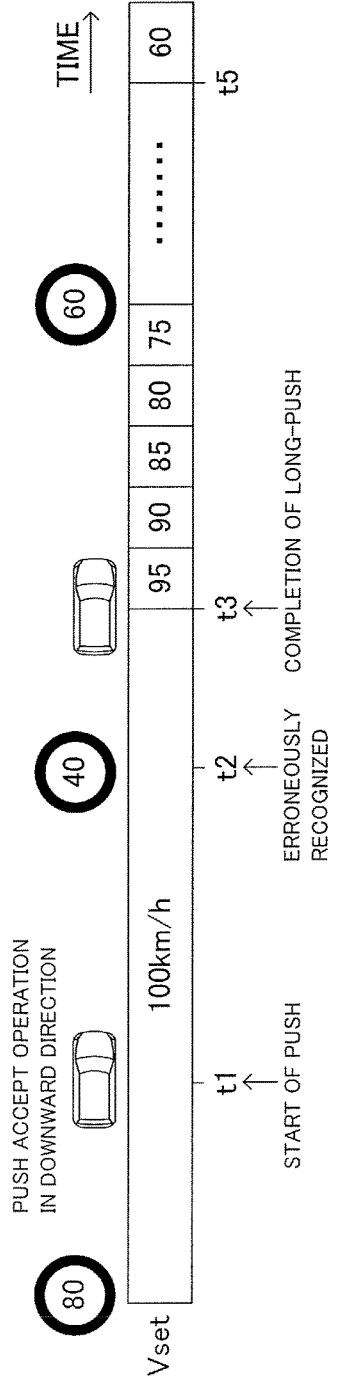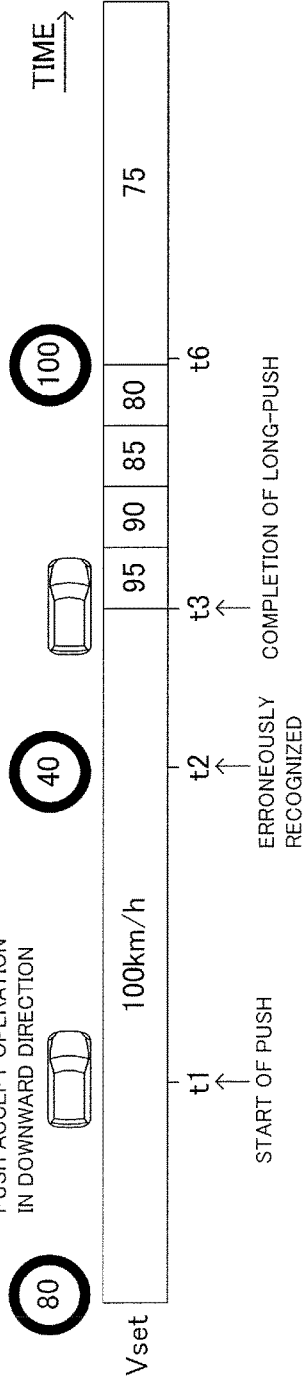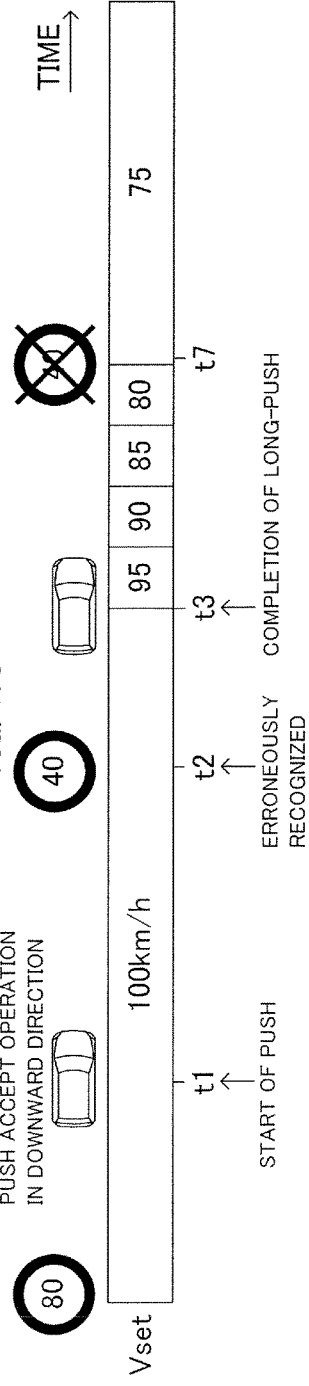

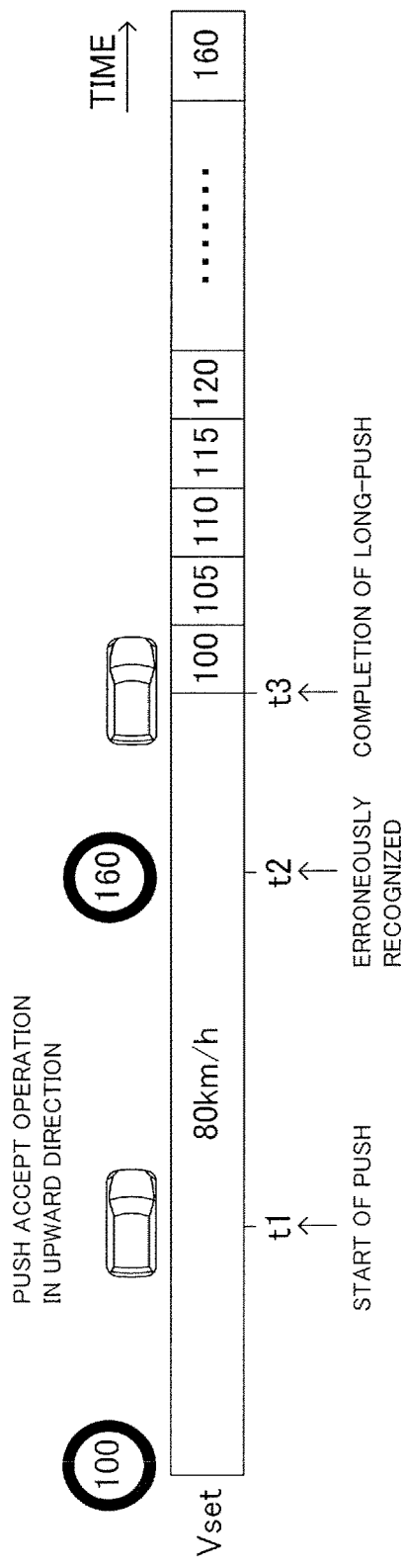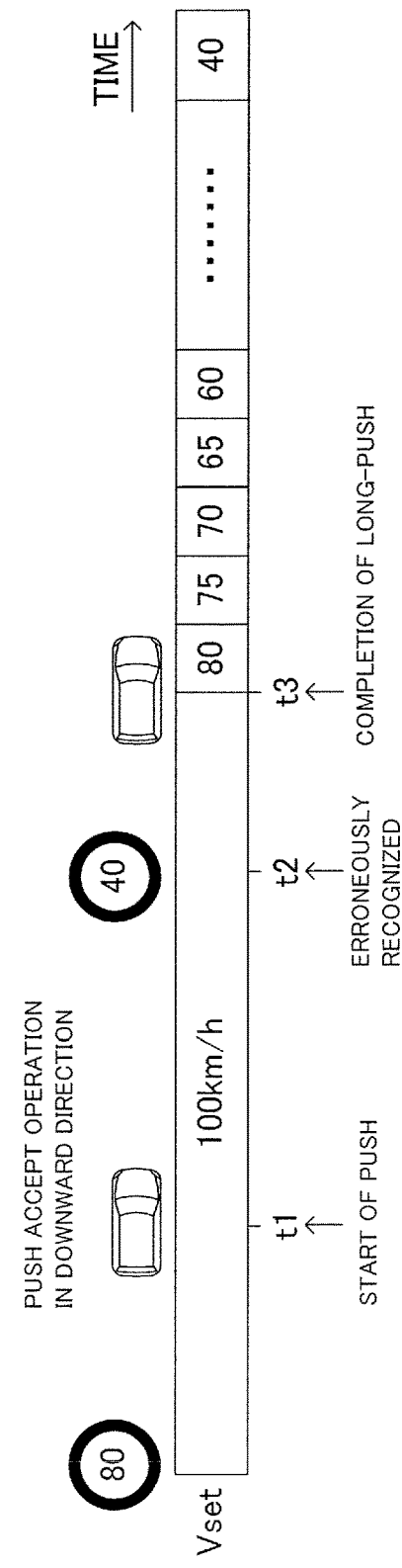

VEHICLE TRAVELING CONTROL APPARATUS

BACKGROUND OF THE INVENTION

1. Field of the Invention

The present invention relates to a vehicle traveling control apparatus which detects a speed limit of a road on which an own vehicle travels and controls travel of the own vehicle based on the speed limit.

2. Description of the Related Art

One of vehicle traveling control apparatuses that are conventionally known detects a speed limit of a road on which an own vehicle travels and sets a target speed of the own vehicle to the speed limit, and thereby to keep the own vehicle traveling at a constant speed which is equal to the speed limit. Such a vehicle traveling control apparatus detects the speed limit of the road on which the own vehicle travels, through obtaining an image of a road sign ahead of the own vehicle with a camera, or based on speed limit information included in map data of a navigation apparatus.

When a vehicle travel control apparatus has own vehicle travel at a constant speed, it is not necessarily preferable to have the vehicle travel at the speed limit. For this reason, for example, an apparatus (hereinafter, referred to as a "conventional apparatus 1") disclosed in Japanese Patent Application Laid-Open (kokai) 2012-224247 A is configured to enable a driver to select whether or not the target speed of the own vehicle is set to the speed limit, using a switch operation of the driver.

When a long-push operation of an operating unit (push operation which continues for a certain time or more) is detected in a state in which the speed limit and the target speed of the own vehicle are displayed on a display device, the conventional device 1 sets the target speed of the own vehicle to the speed limit. Therefore, the driver can keep the own vehicle traveling at a constant speed equal to (according to) the speed limit by performing the long-push operation during the implementation of the constant speed control.

SUMMARY OF THE INVENTION

The above-mentioned vehicle traveling control apparatus includes a speed limit detection apparatus for detecting the speed limit of the road on which the own vehicle is traveling. However, there is a possibility that the speed limit detection apparatus may detect a speed limit different from the actual speed limit. Hereinafter, an expression of "detecting the speed limit different from the actual speed limit" may be replaced with an expression of "erroneously recognizing the speed limit". When the speed limit is erroneously recognized, the conventional vehicle traveling control apparatus sets the target speed to the erroneously-recognized speed limit.

For example, the driver recognizes the speed limit displayed on the display device, and then, performs a permission operation for permitting the speed limit to be set as the target speed. However, immediately before this permission operation (to be more accurate, immediately before the permission operation is detected by the vehicle traveling control apparatus), the speed limit may be erroneously recognized. In this case, the target speed is set to a value which does not match up with the intention of the driver. That is, the target speed is set to the erroneously-recognized speed limit. In order to return the set target speed to the actual speed limit, it is necessary to use the operating unit to increase or decrease the target speed. Generally, as an amount necessary for adjusting the target speed is greater, an amount of operation time and work (e.g., the number of operation times, operation time) of the operating unit required for adjusting the target speed is greater. Therefore, when the actually-set target speed (erroneously-recognized speed limit) and the intended target speed of the driver are greatly different from each other, it is burdensome for the driver to perform the operations for correcting the target speed.

For example, in a situation in which the current target speed is 80 km/h and the speed limit recognized by the speed limit detection apparatus is 100 km/h, assuming that the driver performs the permission operation for keeping the own vehicle traveling at a constant speed equal to (according to) the speed limit (100 km/h), it is expected that the target speed is changed from 80 km/h to 100 km/h at a time point at which the permission operation is detected. However, if the speed limit detection apparatus erroneously detects 160 km/h as the speed limit immediately before the permission operation is detected, the target speed is changed from 80 km/h to 160 km/h at the time point at which the permission operation is detected. If this happens, it is necessary for the driver to perform the correcting operations to decrease the target speed which is 160 km/h (as the initial value) to 100 km/h. In this case, an amount required for adjusting the target speed is 60 km/h (=160-100). Therefore, a large amount of operation time and work of the operating unit is required, which is burdensome for the driver. This causes inconvenience to the driver.

The present invention has been made to cope with the problem described above. That is, one of objects of the present invention is to provide a vehicle traveling control apparatus which allows/enables the driver to easily correct the target speed when the speed limit is erroneously recognized.

In order to achieve the object, a vehicle traveling control apparatus according to an aspect of the present invention includes:

constant speed control means (10) for executing a constant speed control for keeping an own vehicle traveling at a constant speed equal to a target speed without an accelerator pedal operation by a driver;

speed limit detection means (20, 21) for detecting a speed limit of a road on which the own vehicle travels;

display control means (50) for displaying the target speed and a detected speed limit which is the speed limit detected by the speed limit detection means on a display apparatus;

an operating unit (70) which is operated by the driver;

target speed setting means (S30) for, when a permission operation which is an operation of the operating unit for permitting the detected speed limit to be set as the target speed is detected, setting the target speed to the detected speed limit; and target speed adjustment means (S24, S27) for, when an adjustment operation which is an operation of the operating unit for increasing or decreasing the target speed is detected, increasing or decreasing the target speed in response to an amount of the adjustment operation (the number of operation times, operation time, and the like), wherein the display control means is configured to:

display a first display value as the target speed displayed on the display apparatus in such a manner that the first display value is gradually changed from the current target speed toward the detected speed limit, when the permission operation has been detected (S16); and display, in place of the first display value, a second display value which is a value adjusted with respect to a final value of the first display value in response to an amount of the adjustment operation (the number of operation times, operation time, and the like) of the operating unit (S24, S27, S15, FIG. 7C, and FIG. 9C), when the adjustment operation has been detected while the first display value is being changed toward the detected speed limit (S33:Yes, S36:Yes).

The vehicle traveling control apparatus according to the aspect of the present invention includes the constant speed control means for executing the constant speed control for keeping the own vehicle traveling at a constant speed equal to (or in accordance with) the target speed without the accelerator pedal operation by the driver. Further, the vehicle traveling control apparatus has a function for increasing or decreasing the target speed according to an operation of the driver, and a function for setting the speed limit of the road on which the own vehicle travels as the target speed according to an operation of the driver. To realize the functions, the vehicle traveling control apparatus includes the speed limit detection means, the display control means, the operating unit, the target speed setting means, and the target speed adjustment means.

The speed limit detection means detects the speed limit of the road on which the own vehicle travels. The display control means displays, on the display apparatus, the target speed and the detected speed limit which is the speed limit detected by the speed limit detection means. The target speed and the detected speed limit are not necessarily displayed simultaneously. The target speed and the detected speed limit may be displayed separately (at different timings). The operating unit is used for performing an operation related to the setting of the target speed by the driver. The operating unit may include one operating element, but may include a plurality of operating elements.

When the permission operation which is the operation of the operating unit for permitting the detected speed limit to be set as the target speed is detected, the target speed setting means sets the detected speed limit as the target speed. Therefore, the driver can perform the permission operation by using the operating unit to keep the own vehicle traveling at a constant speed equal to (in accordance with) the target speed. When the adjustment operation which is the operation of the operating unit for increasing or decreasing the target speed is detected, the target speed adjustment means increases or decreases the target speed in response to the amount of the adjustment operation (the number of operation times, operation time, and the like). Therefore, the driver can perform the adjustment operation by using the operating unit to keep the own vehicle traveling at a constant speed equal to a speed desired by himself/herself.

When the speed limit detection means has erroneously detected (recognized) a speed limit different from an actual speed limit, the target speed is set to the erroneously-recognized speed limit. In this case, the driver needs to perform the adjustment operation by using the operating unit to return the set target speed to the actual speed limit. If a difference between the set target speed (=erroneously-recognized speed limit) and the correct speed limit (=actual speed limit) is large, it takes a long time and a lot of work for the adjustment operation (correcting operation) to correct the target speed.

In view of the above, when the permission operation is detected, the display control means displays, as the target speed displayed on the display apparatus, the first display value which is gradually changed from the current target speed toward the detected speed limit. For example, the first display value is a value which is increased or decreased by a predetermined amount from the current target speed (at the time the permission operation has been detected) toward the current detected speed limit every time a certain constant time elapses. The first display value is maintained at the detected speed limit when and after the first display value reaches the detected speed limit. The first display value may be the same as the actual target speed (the target speed for the constant speed control), but may be different from the actual target speed. In the former case, the target speed setting means is configured to gradually change the target speed toward the detected speed limit.

When the speed limit detection means has erroneously recognized the speed limit, for example, when the erroneously-recognized speed limit is higher than the correct (actual, true) speed limit, the first display value displayed on the display apparatus exceeds the correct speed limit while the first display value is being changed. Therefore, the driver can notice that an unintended target speed is set before the first display value reaches the erroneously-recognized speed limit. The driver watches the first display value displayed on the display apparatus. When the driver notices that the first display value exceeds the speed limit recognized by himself/herself (i.e., when the driver notices that the first display value has increased or decreased excessively), the driver performs the adjustment operation of the target speed.

When the adjustment operation has been detected while the first display value is being changed toward the detected speed limit, the display control means displays, in place of the first display value, the second display value which is a value adjusted with respect to the final value of the first display value (the first display value immediately before the adjustment operation is detected) in response to an amount of the adjustment operation of the operating unit. Since the target speed can be modified from the first display value before the target speed reaches the erroneously-recognized speed limit, it is possible to reduce operation time and work required for correcting the target speed.

Therefore, according to the present invention, it is possible to easily perform the correcting operation of the target speed, in the case where the speed limit is erroneously recognized.

In an aspect of the present invention, the target speed setting means is configured to set the target speed in such a manner that the target speed is gradually changed from the current target speed toward the detected speed limit in accordance with the change of the first display value (S34, S37) when the permission operation has been detected.

In the aspect of the present invention, when the permission operation has been detected, the target speed is set/changed in accordance with the change of the first display value. Therefore, the target speed is gradually changed from the current target speed toward the detected speed limit.

In an aspect of the present invention, the target speed setting means is configured to set the target speed to the detected speed limit irrespective of the first display value (S42) when the permission operation has been detected.

In the aspect of the present invention, when the permission operation has been detected, the target speed is set irrespective of (regardless of) the first display value. Therefore, it is possible to instantaneously switch the target speed from the current target speed to the detected speed limit.

In an aspect of the present invention, the target speed adjustment means is configured to set the second display value as the target speed (S50, S24, S27), when the second display value is displayed on the display apparatus.

When the adjustment operation has been detected while the first display value is being changed toward the detected speed limit, the second display value is displayed in place of the first display value. The second value displayed in this case is a value which has been adjusted with respect to the final value of the first display value in response to an amount of the adjustment operation of the operating unit. In this case, the target speed adjustment means sets the target speed to the second display value. Therefore, it is possible to keep the own vehicle traveling at a constant speed equal to (according to) the target speed intended by the driver.

In an aspect of the present invention, the operating unit has a common operating unit (70) configured to function as both an operating unit for performing the permission operation and an operating unit for performing the adjustment operation, and the target speed setting means is configured to detect, as the permission operation, a push operation, which is an operation in a direction for bringing the target speed closer to the detected speed limit in a case where the operating unit is used as the operating unit for performing the adjustment operation, and which is a long-push operation in which a duration time of the push operation continues for a predetermined long-push completion time or more (S23:Yes, S26:Yes, S30).

In the aspect of the present invention, it is possible to perform the permission operation and the adjustment operation by using the common operating unit. When the long-push operation in the direction for bringing the target speed closer to the detected speed limit has been detected in the case where the operating unit is used for performing the adjustment operation, the target speed setting means determines that the permission operation has been performed. In such a case where the long-push operation is regarded/treated as the permission operation, the target speed may often be set to a value which is not along with the intention of the driver when the speed limit is erroneously recognized. If this happens, it takes a long time and and a lot of work to perform the adjustment operation (correcting operation) to correct the target speed.

For example, a case is considered where the driver starts a push operation of the operating unit to set the target speed to the speed limit. In this case, when the speed limit is erroneously recognized before the push operation is detected as the permission operation, that is, before the duration time of the push operation reaches the long-push completion time, the target speed is set to a value which is not along with the intention of the driver. Therefore, an operation(s) for correcting the target speed is required. When a large amount of operation time and work for correcting the target speed is required, it is burdensome for the driver to correct the target speed, and therefore, this causes inconvenience to the driver.

Accordingly, the present invention can be effective when it is applied to, in particular, the apparatus which is configured to regard/treat the long-push operation as the permission operation.

Further, the present invention may be a vehicle traveling control apparatus which sets an upper speed limit of an own vehicle to the speed limit. The vehicle traveling control apparatus includes:

vehicle speed limiting control means for controlling a driving force and a braking force of an own vehicle in such a manner that a vehicle speed of the own vehicle does not exceed an upper speed limit;

speed limit detection means for detecting a speed limit of a road on which the own vehicle travels;

display control means for displaying the upper speed limit and a detected speed limit which is the speed limit detected by the speed limit detection means on a display apparatus;

an operating unit which is operated by the driver;

upper speed limit setting means for, when a permission operation which is an operation of the operating unit for permitting the detected speed limit to be set as the upper speed limit is detected, setting the upper speed limit to the detected speed limit; and upper speed limit adjustment means for, when an adjustment operation which is an operation of the operating unit for increasing or decreasing the upper speed limit is detected, increasing or decreasing the upper speed limit in response to an amount of the adjustment operation (the number of operation times, operation time, and the like), wherein the display control means is configured to:

display a first display value as the upper speed limit displayed on the display apparatus in such a manner that the first display value is gradually changed from the current upper speed limit toward the detected speed limit, when the permission operation has been detected; and end the display of the first display value, and display a second display value which is a value adjusted with respect to a final value of the first display value in response to an amount of the adjustment operation (the number of operation times, operation time, and the like), when the adjustment operation has been detected while the first display value is being changed toward the detected speed limit.

The vehicle traveling control apparatus according to the present invention includes the vehicle speed limiting control means for controlling the driving force and the braking force of the own vehicle in such a manner that the vehicle speed of the own vehicle does not exceed the upper speed limit. Further, the vehicle traveling control apparatus has/realizes a function for increasing or decreasing the upper speed limit according to an operation of the driver, and a function for setting the speed limit of the road on which the own vehicle travels as the upper speed limit according to an operation of the driver. In order to realize such functions, the vehicle traveling control apparatus includes the speed limit detection means, the display control means, the operating unit, the upper speed limit setting means, and the upper speed limit adjustment means.

The speed limit detection means detects the speed limit of the road on which the own vehicle travels. The display control means displays the upper speed limit and the detected speed limit which is the speed limit detected by the speed limit detection means on the display apparatus. The upper speed limit and the speed limit are not necessarily displayed simultaneously. The upper speed limit and the speed limit may be displayed separately (at different timings). The operating unit is used for performing an operation to set the upper speed limit by the driver. The operating unit may include one operating element, but may include a plurality of operating elements.

When the permission operation of the operating unit for permitting the detected speed limit to be set as the upper speed limit is detected, the upper speed limit setting means sets the upper speed limit to the detected speed limit. Therefore, by performing the permission operation using the operating unit, the driver can travel the own vehicle such that the vehicle speed of the own vehicle does not exceed the upper speed limit. When the adjustment operation of the operating unit for increasing or decreasing the upper speed limit is detected, the upper speed limit adjustment means increases or decreases the upper speed limit in response to an amount of the adjustment operation. Therefore, by performing the adjustment operation using the operating unit, the driver can travel the own vehicle with the upper speed limit desired by himself/herself.

When the speed limit detection means has erroneously detected (recognized) a speed limit different from an actual speed limit, the erroneously-recognized speed limit is set as the target speed. In this case, the driver needs to perform the adjustment operation by using the operating unit to return the set upper speed limit to the actual speed limit. If a difference between the set upper speed limit (=erroneously-recognized speed limit) and the correct speed limit (=actual speed limit) is large, it takes a long time and a lot of work to perform the adjustment operation (correcting operation) to correct the upper speed limit.

Therefore, when the permission operation has been detected, the display control means displays, as the upper speed limit displayed on the display apparatus, the first display value which is gradually changed from the current upper speed limit toward the detected speed limit. For example, the first display value is a value which is increased or decreased by a predetermined amount from the current upper speed limit (at the time at which the permission operation has been detected) toward the current detected speed limit every time a certain constant time elapses. The first display value is maintained at the detected speed limit when and after the first display value reaches the detected speed limit. The first display value may be the same as the actual upper speed limit (the upper speed limit for the travel control), but may be different from the actual upper speed limit. In the former case, the upper speed limit setting means is configured to gradually change the upper speed limit toward the detected speed limit.

When the speed limit detection means erroneously recognizes the speed limit, for example, when the erroneously-recognized speed limit is higher than the correct speed limit, the first display value displayed on the display apparatus exceeds the correct speed limit while the first display value is being changed. Therefore, it is possible for the driver to notice that an unintended upper speed limit is set before the first display value reaches the erroneously-recognized speed limit. The driver watches the first display value displayed on the display apparatus. When the driver notices that the first display value exceeds the speed limit recognized by himself/herself (i.e., when the first display value has increased or decreased excessively), the driver performs the adjustment operation of the upper speed limit.

When the adjustment operation is detected while the first display value is being changed toward the detected speed limit, the display control means displays, as substitute for the first display value, the second display value which is adjusted with respect to (using) the final value of the first display value (the first display value immediately before the adjustment operation is detected) in response to an amount of the adjustment operation of the operating unit. Since the upper speed limit can be modified from the first display value before the upper speed limit reaches the erroneously-recognized speed limit, it is possible to reduce operation time and work required for correcting the upper speed limit.

Therefore, according to the present invention, it is possible to easily perform the correcting operation of the upper speed limit when the speed limit is erroneously recognized.

In the above description, references used in the following descriptions regarding embodiments are added with parentheses to the elements of the present invention, in order to assist in understanding the present invention. However, those references should not be used to limit the scope of the invention.

BRIEF DESCRIPTION OF THE DRAWINGS

FIG. 7A is a diagram illustrating the change of the target speed when a push accept operation in an upward direction is performed.

FIG. 7B is a diagram illustrating the change of the target speed when the push accept operation in the upward direction is performed.

FIG. 7C is a diagram illustrating the change of the target speed when the push accept operation in the upward direction is performed.

FIG. 8A is a diagram illustrating the change of the target speed when the push accept operation in the upward direction is performed.

FIG. 8B is a diagram illustrating the change of the target speed when the push accept operation in the upward direction is performed.

FIG. 8C is a diagram illustrating the change of the target speed when the push accept operation in the upward direction is performed.

FIG. 9A is a diagram illustrating the change of the target speed when a push accept operation in a downward direction is performed.

FIG. 9B is a diagram illustrating the change of the target speed when the push accept operation in the downward direction is performed.

FIG. 9C is a diagram illustrating the change of the target speed when the push accept operation in the downward direction is performed.

FIG. 10A is a diagram illustrating the change of the target speed when the push accept operation in the downward direction is performed.

FIG. 10B is a diagram illustrating the change of the target speed when the push accept operation in the downward direction is performed.

FIG. 10C is a diagram illustrating the change of the target speed when the push accept operation in the downward direction is performed.

FIG. 12A is a diagram illustrating the change of the target speed in a modified example when the accept operation is performed.

FIG. 12B is a diagram illustrating the change of the target speed in a modified example when the accept operation is performed.

DETAILED DESCRIPTION OF THE EMBODIMENTS

Figure 1:
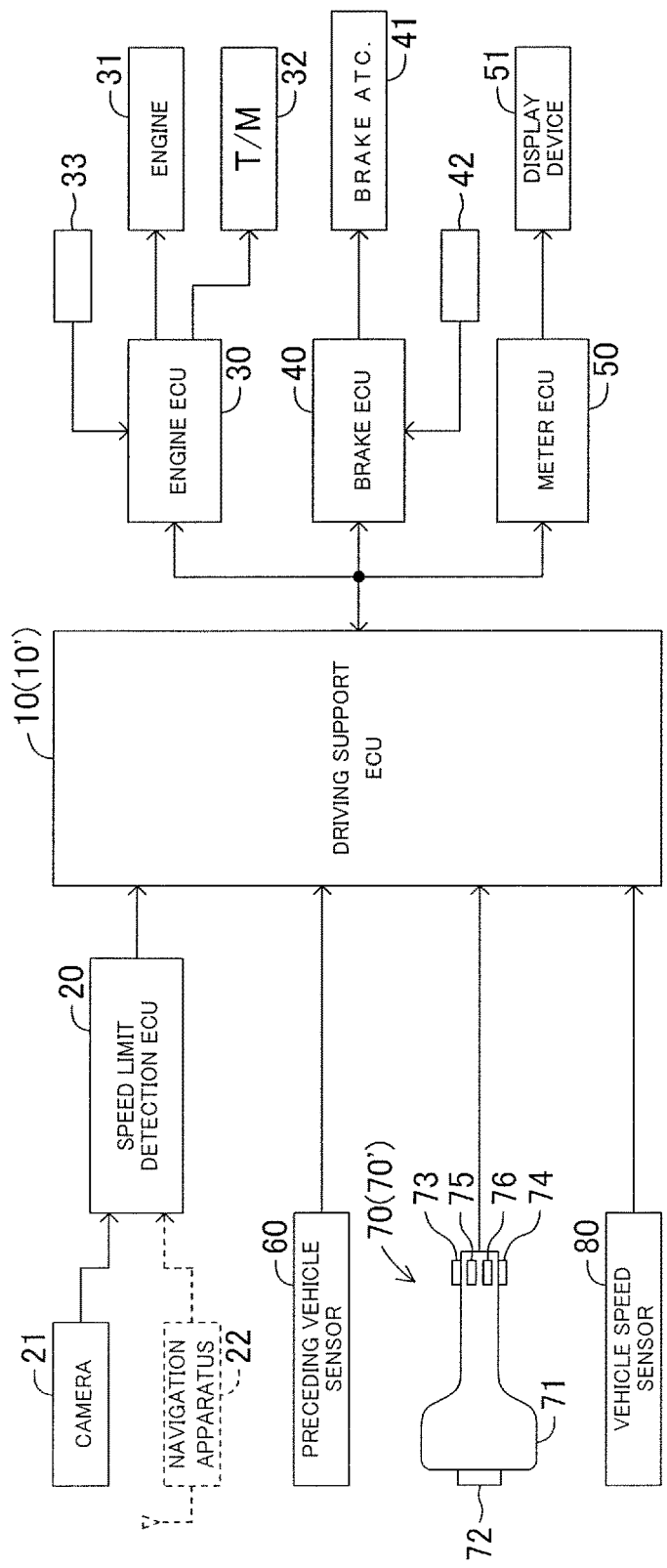
FIG. 1 is a schematic configuration diagram of a vehicle traveling control apparatus according to the present embodiment.

A vehicle traveling control apparatus according to the present invention will next be described with reference to the drawings. FIG. 1 is a schematic configuration diagram of a vehicle traveling control apparatus according to the present embodiment.

The vehicle traveling control apparatus according to the present embodiment is a driving support/assist system for implementing RSA-ACC (Road Sign Assist-Adaptive Cruise Control). The RSA-ACC is a driving support/assist control in which a function for setting a target speed to a speed limit is additionally provided to a cruise control with an inter-vehicle control function (hereinafter, referred to as "ACC"). The ACC is a driving support/assist control including (i) a constant speed control (CC: Cruise Control) to keep an own vehicle traveling at a certain constant speed in accordance with a target speed (so called "set vehicle speed") set arbitrarily by a driver, and further including (ii) an inter-vehicle control to enable the own vehicle to follow/trail a preceding vehicle so as to keep an inter-vehicle distance between the own vehicle and the preceding vehicle at a predetermined distance. Therefore, when the RSA-ACC is implemented, it is possible to drive the own vehicle at a constant speed in accordance with (i.e., set to be equal to) the speed limit without requiring an accelerator pedal operation by the driver.

When the RSA-ACC is implemented, a speed limit of a road on which the own vehicle is traveling is acquired in real time. During the execution of the RSA-ACC, if the acquired speed limit differs from the current target speed, the driver is notified of that situation/fact. When the driver performs a specific operation for acceptance/permission (that is, when the driver performs an
acceptance-response-operation/permission-response-operation) in response to the notification, the target speed is set to the speed limit (i.e., the target speed is made equal to the speed limit).

A configuration of the vehicle traveling control apparatus will be described below.

As illustrated in FIG. 1, the vehicle traveling control apparatus includes a driving support (assist) ECU 10, a speed limit detection ECU 20, an engine ECU 30, a brake ECU 40, and a meter ECU 50. Each of these ECUs is an electric control unit including a microcomputer as a main part. In addition, these ECUs are connected with each other so as to transmit and receive information via a CAN (Controller Area Network). In the present specification, the microcomputer includes a CPU, a ROM, a RAM, a non-volatile memory, an interface I/F, and the like. The CPU is configured to implement various functions by executing instructions (programs, routines) stored in the ROM. In the present embodiment, the driving support ECU 10 and the engine ECU 30 are provided separately, but the engine ECU 30 may include the functions of the driving support ECU 10.

The speed limit detection ECU 20 is the electric control unit which detects a speed limit of a road on which the own vehicle is traveling currently, and is connected to an in-vehicle camera 21. The in-vehicle camera 21 takes an image ahead of the vehicle, and transmits the obtained image information to the speed limit acquisition ECU 20. The speed limit detection ECU 20 has an image analysis function. The speed limit detection ECU 20 receives the image information output from the in-vehicle camera 21, recognizes a road sign (or a road mark) from the image information, and detects the speed limit (legal speed limit) indicated by the road sign. Accordingly, while the vehicle travels, the speed limit detection ECU 20 constantly receives the image information transmitted from the in-vehicle camera 21, analyzes the image information, and detects (recognizes) the speed limit indicated by the road sign positioned ahead of the own vehicle.

In order to detect the speed limit, a navigation apparatus 22 (illustrated by a broken line in FIG. 1) can be used in place of (or in addition to) the in-vehicle camera 21. The navigation apparatus 22 includes a GPS receiver for detecting a position of the own vehicle, a storage device for storing map information and road information, and a communication device for acquiring the latest map information and the latest road information from outside. The road information includes speed limit information. The navigation apparatus 22 may extract the speed limit information indicating the speed limit of the road on which the own vehicle is currently traveling based on a current position of the own vehicle on the map and the road information, and may output the extracted speed limit information to the speed limit detection ECU 20.

It should be noted that the navigation apparatus 22 may not be provided with the storage apparatus for storing the map information and the road information. For example, the navigation apparatus 22 may include a wireless communication terminal which receives the latest map information and the latest road information whenever necessary from an external information providing apparatus (infrastructure facility).

When the speed limit detection ECU 20 acquires the speed limit in this manner, the speed limit detection ECU 20 outputs/transmits the acquired speed limit to the driving support ECU 10.

The driving support ECU 10 is connected to a preceding vehicle sensor 60, a cruise operating unit/element 70, and a vehicle speed sensor 80.

The preceding vehicle sensor 60 has a function for acquiring information on the preceding vehicle (existing) ahead of the own vehicle, and, for example, includes a radar sensor and a camera. As the preceding vehicle sensor 60, other and various configurations may be used as long as the preceding vehicle can be detected and the distance between the own vehicle and the preceding vehicle can be detected. The preceding vehicle sensor 60 does not necessarily include both the radar sensor and the camera, but may include at least one of the radar sensor and the camera. Further, the preceding vehicle sensor 60 may include other sensors.

For example, the radar sensor irradiates a radio wave in the millimeter wave band in a forward direction, and in a case where a preceding vehicle exists, the radar sensor receives a reflected wave from the preceding vehicle. Then, based on the irradiation timing and the reception timing of the radio wave and the like, the radar sensor determines the presence or absence of a preceding vehicle, and calculates a distance between the own vehicle and the preceding vehicle (referred to as a "preceding vehicle inter-vehicle distance"), a relative speed between the own vehicle and the preceding vehicle (referred to as a "preceding vehicle relative speed"), and the like. The radar sensor outputs these calculation results to the driving support ECU 10. The camera is, for example, a stereo camera, and takes images of left and right landscapes ahead of the own vehicle. Based on the taken image data of the left and right sides, the camera determines the presence or absence of the preceding vehicle, and calculates the preceding vehicle inter-vehicle distance, the preceding vehicle relative speed, and the like. The camera outputs these calculation results to the driving support ECU 10. Hereinafter, information representing the presence or absence of the preceding vehicle, the preceding vehicle inter-vehicle distance, the preceding vehicle relative speed, and the like is referred to as "preceding vehicle information".

Figure 2:
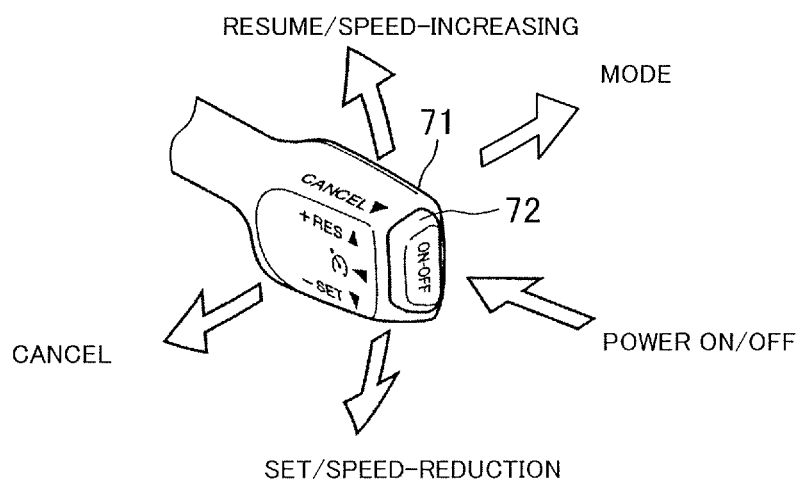
FIG. 2 is an explanatory drawing illustrating operation directions of a cruise operating unit.

The cruise operating unit 70 is provided with an operation lever 71. A base portion of the operation lever 71 is attached to a back side of a steering wheel, and an end portion of the operation lever 71 extends toward the outside in the radial direction of the steering wheel. As illustrated in FIG. 2, the end portion of the operation lever 71 is provided so as to swingably move upward, downward, frontward (rearward of the vehicle), and backward (forward of the vehicle) as seen from the driver.

The cruise operating unit 70 includes a main switch 72 provided at the end portion of the operation lever 71, a resume/speed-increasing switch 73, a set/speed-reduction switch 74, a cancel switch 75, and a mode switch 76. The resume/speed-increasing switch 73, the set/speed-reduction switch 74, the cancel switch 75, and the mode switch 76 can be turned ON by operation of the operation lever 71. Hereinafter, the operation direction of the cruise operating unit 70 means a direction viewed from the driver sitting on a driver's seat.

In the cruise operating unit 70, except for the main switch 72, one of the switches which is being pushed in the operation direction turns ON only while the operation lever 71 is being operated by the driver. When the driver releases his/her hand from the operation lever 71, the operation lever 71 returns to an initial position so that each of the switches 73, 74, 75, and 76 turns OFF. In the present embodiment, as illustrated in FIG. 2, when the end portion of the operation lever 71 is pushed upward, the resume/speed-increasing switch 73 turns ON. When the end portion of the operation lever 71 is pushed downward, the set/speed-reduction switch 74 turns ON. When the end portion of the operation lever 71 is drawn to the near side (driver's side), the cancel switch 75 turns ON. When the end portion of the operation lever 71 is pushed backward (forward of the vehicle), the mode switch 76 turns ON. Furthermore, the main switch 72 is a main power switch whose ON/OFF state is alternately switched every time the push operation is performed.

The driving support ECU 10 is configured such that, only when the main switch 72 of the cruise operating unit 70 is in the ON state, the switch (the resume/speed-increasing switch 73, the set/speed-reduction switch 74, the cancel switch 75, or the mode switch 76) can function so as to be turned ON/OFF in response to the push operation of the operation lever 71.

When the main switch 72 is in the ON-state and the target speed has not been set yet, the driving support ECU 10 sets (stores), as the target speed, an actual vehicle speed (i.e., vehicle speed detected by the vehicle speed sensor 80) at the time point at which the set/speed-reduction switch 74 is turned OFF after the set/speed-reduction switch 74 is turned ON. In addition, when the set/speed-reduction switch 74 is turned ON in a case where the target speed has been set, the driving support ECU 10 decreases the target speed by a decrease width/amount corresponding to one lever-operation (push-operation) duration time.

For example, when the operation lever 71 is pushed downward momentarily (when the ON-duration time of the set/speed-reduction switch 74 is less than a predetermined time (for example, 0.6 seconds)), the driving support ECU 10 decreases the target speed by a predetermined speed (for example, 1 km/h) which is a small decrease width/amount. Hereinafter, this operation may be referred to as a "tap-down operation". Further, when the operation lever 71 is pushed downward continuously for a predetermined time or more (when the ON-duration time of the set/speed-reduction switch 74 is equal to or longer than the predetermined time (for example, 0.6 seconds)), the driving support ECU 10 gradually (at a predetermined cycle) decreases the target speed by a predetermined speed interval (for example, 5 km/h) which is a large decrease width/amount while the operation lever 71 is being pushed (while the set/speed-reduction switch 74 is in the ON-state). As this operation gradually decelerates the own vehicle, this operation may be hereinafter referred to as a "coast operation".

When the resume/speed-increasing switch 73 is turned ON while the target speed has been set, the driving support ECU 10 increases the target speed by an increase width/amount corresponding to one-lever operation (push-operation) duration time. For example, when the operation lever 71 is momentarily pushed upward (when the ON-duration time of the resume/speed-increasing switch 73 is less than a predetermined time (for example, 0.6 seconds)), the driving support ECU 10 increases the target speed by a predetermined speed (for example, 1 km/h) which is a small increase width/amount for one lever operation. Hereinafter, this operation may be referred to as a "tap-up operation".

Further, when the operation lever 71 is pushed upward continuously for a predetermined time or more (when the ON-duration time of the resume/speed-increasing switch 73 is equal to or longer than a predetermined time (for example, 0.6 seconds)), the driving support ECU 10 gradually (at a predetermined cycle) increases the target speed by a predetermined speed interval (for example, 5 km/h) which is a large increase width/amount while the operation lever 71 is being pushed for the predetermined time or more (while the resume/speed-increasing switch 73 is in the ON-state). As this operation gradually accelerates the own vehicle, this operation may be hereinafter referred to as an "acceleration operation".

Hereinafter, regarding the operation of the operation lever 71, the operation for continuously pushing the operation lever 71 for the predetermined time or longer is referred to as a "long-push operation", and the operation for momentarily pushing the operation lever 71 is referred to as a "short-push operation". The driving support ECU 10 measures the ON-duration time of the switch that is turned ON by pushing the operation lever 71 (the ON-duration time being a time for which the pushed switch is continuously in the ON-state). When the ON-duration time is equal to or longer than the predetermined time (hereinafter referred to as a "long-push completion time"), the driving support ECU 10 regards this operation as the long-push operation. On the other hand, when the ON-duration time is less than the long-push completion time, the driving support ECU 10 regards the operation as the short-push operation. Hereinafter, when it is unnecessary to distinguish between the long-push operation and the short-push operation, they are simply referred to as a "push operation" or an "operation". Furthermore, when the push operation is determined to be the long-push operation, an expression that "the long-push operation has been completed/confirmed" is used.

When the cancel switch 75 is turned ON or the main switch 72 is turned OFF while the traveling control (the inter-vehicle control or the constant speed control) is being performed, the driving support ECU 10 deactivates/terminates the traveling control. When the cancel switch 75 is turned ON, the driving support ECU 10 stores the target speed at that time. When the main switch 72 is turned OFF, the driving support ECU 10 erases the target speed (clear the memory value of the target speed) at that time.

When the resume/speed-increasing switch 73 is turned ON after deactivating the traveling control by turning ON the cancel switch 75, the driving support ECU 10 resumes the traveling control using the target speed which was stored when the cancel switch 75 was turned ON.

In the above manner, the driver uses the cruise operating unit 70 to increase or decrease the target speed (set vehicle speed) for the constant speed control.

The mode switch 76 is a switch for switching a traveling control mode of the (own) vehicle between the inter-vehicle control mode and the constant speed control mode. Further, a switch (not shown in the figures) is provided that is capable of selecting whether to activate a function (called "RSA function") for setting the target speed to the speed limit. Therefore, the traveling control mode of the (own) vehicle includes (i) the RSA-ACC mode for executing the inter-vehicle control with the RSA function, (ii) an ACC mode for executing the inter-vehicle control (ACC) without activating the RSA function, (iii) a RSA-CC mode for executing the constant speed control (CC) with the RSA function, and (iv) a CC mode for executing the constant speed control (CC) without activating the RSA function. In addition, the traveling control mode of the vehicle may be switched in response to an operation time of the main switch 72, in place of the operation of the mode switch 76. For example, the constant speed control mode may be set by the long-push operation of the main switch 72, and the inter-vehicle control mode may be set by the short-push operation of the main switch 72.

When executing the inter-vehicle control (RSA-ACC and ACC), if the preceding vehicle is detected ahead of the own vehicle, the driving support ECU 10 has the own vehicle follow the preceding vehicle while maintaining the distance between the preceding vehicle and the own vehicle at an appropriate distance. If the preceding vehicle is not detected, the driving support ECU 10 keeps the own vehicle traveling at a constant speed corresponding to (equal to) the target speed. Further, during the execution of the constant speed control (the RSA-CC mode and the CC mode), the driving support ECU 10 keeps the own vehicle traveling at a constant speed corresponding to (equal to) the target speed.

Further, when the driving support ECU 10 keeps the own vehicle traveling at a constant speed under the execution of either the RSA-ACC mode or the RSA-CC mode, the driving support ECU 10 can set the target speed of the constant speed control to the speed limit which has been recognized by the speed limit detection ECU 20. Hereinafter, there is no need to distinguish between the RSA-ACC and the RSA-CC, and therefore, they are collectively referred to as a "RSA-ACC". Similarly, when the ACC and the CC do not need to be distinguished from each other, they are collectively referred to as an "ACC".

The cruise operating unit 70 is not only used for setting the ACC such as setting the target speed, but also used as an operating unit for accepting setting the target speed to the speed limit. When the cruise operating unit 70 is operated so as to allow the speed limit to be set as the target speed, the driving support ECU 10 sets the target speed to the speed limit which has been detected (recognized) by the speed limit detection ECU 20. Such a specific responsive operation (permission-response-operation or acceptance-response-operation) for accepting setting the target speed to the speed limit will be described later.

The engine ECU 30 is connected to various sensors 33 necessary for controlling an engine 31 and controlling a transmission 32. The engine ECU 30 performs a fuel injection control, an ignition control, and an intake air amount control of the engine 31, based on a required driving force. Further, the engine ECU 30 performs a shift control of the transmission 32 based on a shift up line and a shift down line that are predetermined with respect to the vehicle speed and a throttle opening degree.

The driving support ECU 10 calculates a target acceleration of the own vehicle while either the constant speed control or the inter-vehicle control is being executed. For example, while the driving support ECU 10 is executing the constant speed control, it calculates the target acceleration of the own vehicle in such a manner that the vehicle speed of the own vehicle follows (comes closer to) the target speed, based on the vehicle speed detected by the vehicle speed sensor 80 and the target speed. Further, while the driving support ECU 10 is executing the inter-vehicle control, it calculates the target acceleration of the own vehicle in such a manner that a distance between the own vehicle and the preceding vehicle follows (comes closer to) a target inter-vehicle distance which is set according to the vehicle speed. Then, the driving support ECU 10 calculates a required driving force (including a negative value, that is, a required braking force) necessary to accelerate the own vehicle (or to decelerate the own vehicle when the target acceleration is negative) at the calculated target acceleration. The driving support ECU 10 transmits the required driving force to the engine ECU 30.

The engine ECU 30 controls the engine 31 and the transmission 32 according to the required driving force. When the required driving force has a value requiring a large braking force, and the engine 31 and the transmission 32 alone cannot satisfy the required driving force, the engine ECU 30 transmits a required braking force to the brake ECU 40 so as to compensate for the shortage in the braking force using the hydraulic brake.

The brake ECU 40 is connected to a brake actuator 41. The brake actuator 41 is provided in a hydraulic circuit (not shown) between a master cylinder that pressurizes brake oil by a brake pedal and a wheel cylinder that is built in a brake caliper of each wheel. The brake ECU 40 is connected to various sensors 42 necessary for controlling the brake actuator 41. The brake ECU 40 controls the brake actuator 41 based on the required braking force to generate a frictional braking force on the wheels.

The meter ECU 50 is connected to a display device 51 provided at a visible position from the driver's seat. When performing the RSA-ACC, the driving support ECU 10 transmits to the meter ECU 50 information on the current target speed, the preceding vehicle information including the presence or absence of the preceding vehicle, and information on the speed limit. The meter ECU 50 displays the current target speed on the display device 51 in accordance with the information transmitted from the driving support ECU 10. Further, when the preceding vehicle is detected in the inter-vehicle control mode, the meter ECU 50 displays the presence of the preceding vehicle on the display device 51. The screen thus displayed is called a normal display screen.

When the speed limit and the target speed are different from each other, the driving support ECU 10 transmits to the meter ECU 50 an inquiry display command for displaying an inquiry display screen on the display device 51. Upon receipt of the inquiry display command, the meter ECU 50 displays on the display device 51 the inquiry display screen displaying the speed limit, the target speed, and a mark indicating an operation direction for the specific responsive operation for acceptance (operation direction for the acceptance-response-operation: the operation direction of the operation lever 71 in the present embodiment). It should be noted that the speed limit and the target speed are displayed on the display device 51 using values of them.

Although the RSA-ACC has the function for setting the speed limit of the road on which the own vehicle is traveling as the target speed of the ACC, it is not always preferable to set the target speed to the speed limit, depending on the standpoint of the driver or in view of various situations. Therefore, when the speed limit and the target speed are different from each other, the driving support ECU 10 inquires of the driver whether or not the driver wishes to set the target speed to the speed limit. For this inquiry, the inquiry display screen is displayed on the display device 51.

Figure 3:
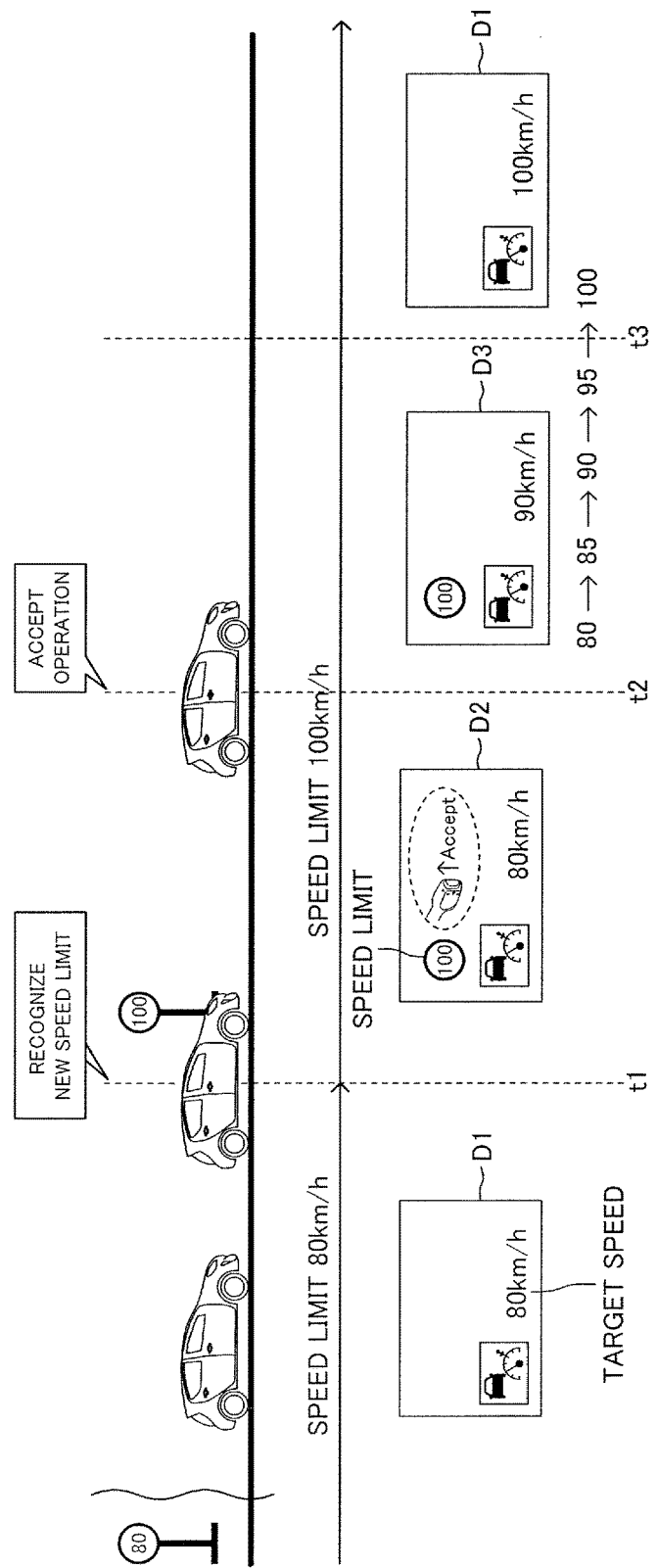
FIG. 3 is an explanatory drawing illustrating a switching of a display screen.

For example, as illustrated in FIG. 3, when the vehicle travels at a target speed of 80 km/h on a road with a speed limit of 80 km/h, a normal display screen D1 is displayed on the display device 51. With this normal display screen D1, the driver can recognize that the target speed is 80 km/h. At the time t1 at which the speed limit detection ECU 20 detects (recognizes) a new speed limit (100 km/h) from a road sign, the speed limit detection ECU 20 transmits information on the new speed limit to the driving support ECU 10. The driving support ECU 10 transmits the new speed limit, the current target speed, and the inquiry display command to the meter ECU 50, to have the meter ECU 50 display the inquiry display screen D2 on the display device 51.

The inquiry display screen D2 includes the target speed at the present time, the speed limit at the present time, and the mark (refer to a portion surrounded by a broken line: hereinafter referred to as an "accept direction mark") indicating the operation direction for the acceptance-response-operation. When the speed limit is higher than the target speed, the meter ECU 50 displays the accept direction mark indicating that the operation direction for the acceptance-response-operation to be conducted using the cruise operating unit 70 is upward. When the speed limit is lower than the target speed, the meter ECU 50 displays the accept direction mark indicating that operation direction for the acceptance-response-operation to be conducted using the cruise operating unit 70 is downward. In the example of FIG. 3, since the target speed at that time is 80 km/h whereas the speed limit is 100 km/h, the accept direction mark indicates that the push operation direction of the cruise operating unit 70 (operation direction for the acceptance-response-operation) is upward.

While the inquiry display screen D2 is displayed on the display device 51, if the long-push operation of the cruise operating unit 70 is performed in the direction indicated by the accept direction mark, the driving support ECU 10 sets the target speed to the speed limit. Therefore, by performing the long-push operation of the operation lever 71 in the operation direction for the acceptance-response-operation, the driver can keep the own vehicle traveling at a constant speed equal to (according to) the speed limit.

For example, if it is detected that the upward long-push operation of the cruise operating unit 70 is performed while the speed limit is higher than the target speed, the driving support ECU 10 sets the target speed to the speed limit (whereas, if the direction of the long-push operation of the cruise operating unit 70 is the downward direction, the driving support ECU 10 does not set the target speed to the speed limit). On the other hand, if it is detected that the downward long-push operation of the cruise operating unit 70 is performed while the speed limit is lower than the target speed, the driving support ECU 10 sets the target speed to the speed limit (whereas, if the direction of the long-push operation of the cruise operating unit 70 is the upward direction, the driving support ECU 10 does not set the target speed to the speed limit).

In a case where the speed limit is higher than the target speed, the direction of the permission-response-operation for permitting the speed limit to be set as the target speed is set to be the same direction as the direction of the operation of the cruise operating unit 70 for increasing the target speed. On the other hand, in a case where the speed limit is lower than the target speed, the direction of the permission-response-operation is set to be the same direction as the direction of the operation of the cruise operating unit 70 for decreasing the target speed. Accordingly, the direction of the permission-response-operation is set to be the same direction as the operation direction of the cruise operating unit 70 for bringing the target speed closer to the speed limit.

Further, in order to determine whether or not the specific response operation has been performed according to the driver's intention, for/as the permission-response-operation to accept setting the target speed to the speed limit, the long-push operation of the cruise operating unit 70 is required. Therefore, even when the cruise operating unit 70 is pushed in the direction of the permission-response-operation while the inquiry display screen D2 is being displayed, the driving support ECU 10 does not accept the push operation as the permission-response-operation unless the push operation is the long-push operation.

In this manner, the function for the long-push operation using the cruise operating unit 70 is switched between the function which is effective when the normal display screen D1 is being displayed and the function which is effective when the inquiry display screen D2 is being displayed. That is, while the normal display screen D1 is being displayed, the long-push operation (in the upward direction or downward direction) of the cruise operating unit 70 functions as the acceleration operation or the coast operation. On the other hand, while the inquiry display screen D2 is being displayed, if the direction of the long-push operation of the cruise operating unit 70 is the direction of the permission-response-operation, the long-push operation of the cruise operating unit 70 functions as the permission-response-operation for permitting the speed limit to be set as the target speed. While the inquiry display screen D2 is being displayed, if the direction of the long-push operation of the cruise operating unit 70 is not the direction of the permission-response-operation, the long-push operation of the cruise operating unit 70 functions as the acceleration operation or the coast operation.

Hereinafter, the permission/acceptance response for accepting setting the target speed to the speed limit is called "accept", and the permission response operation is called an "accept operation". Further, the direction of the permissionresponse-operation (i.e., the operation direction for bringing the target speed closer to the speed limit) is called an "accept direction".

When the accept operation is detected, the driving support ECU 10 does not instantaneously set the target speed to the speed limit, but gradually changes the target speed toward the speed limit. For example, when the accept operation is detected in a situation in which the current target speed is 80 km/h and the speed limit detected by the speed limit detection ECU 20 is 100 km/h, the driving support ECU 10 changes the target speed by a predetermined amount (5 km/h in this example) every time a certain constant time elapses as follows: 80 km/h→85 km/h→km/h→95 km/h→100 km/h. Hereinafter, changing the target speed toward the speed limit gradually is expressed as a "gradual-change" or a "gradual-change process".

When the target speed is gradually changed toward the speed limit, the driving support ECU 10 transmits to the meter ECU 50 a gradual-change display command in addition to information indicating the target speed and the speed limit. The gradual-change display command is a command for displaying a gradual-change display screen D3 on the display device 51. In this manner, the driving support ECU 10 has the meter ECU 50 display the gradual-change display screen D3 on the display device 51.

As illustrated in FIG. 3, the gradual-change display screen D3 is a screen in which the accept direction mark is removed from the inquiry display screen D2 and on which a display value of the target speed changes according to the change in the target speed. For example, when the accept operation of the cruise operating unit 70 is detected (at the time t2) in a state where the inquiry display screen D2 is being displayed, the gradual-change display screen D3 starts to be displayed. In the gradual-change display screen D3, the target speed gradually changes toward the speed limit by the predetermined amount every time a certain constant time elapses, and thereafter, the target speed finally reaches the same value as the speed limit. When the target speed reaches the speed limit, the driving support ECU 10 stops transmitting the gradual-change display command to the meter ECU 50. Therefore, at the time t3 in FIG. 3, the meter ECU 50 switches the screen displayed on the display device 51 from the gradual-change display screen D3 to the normal display screen D1.

Figure 4:
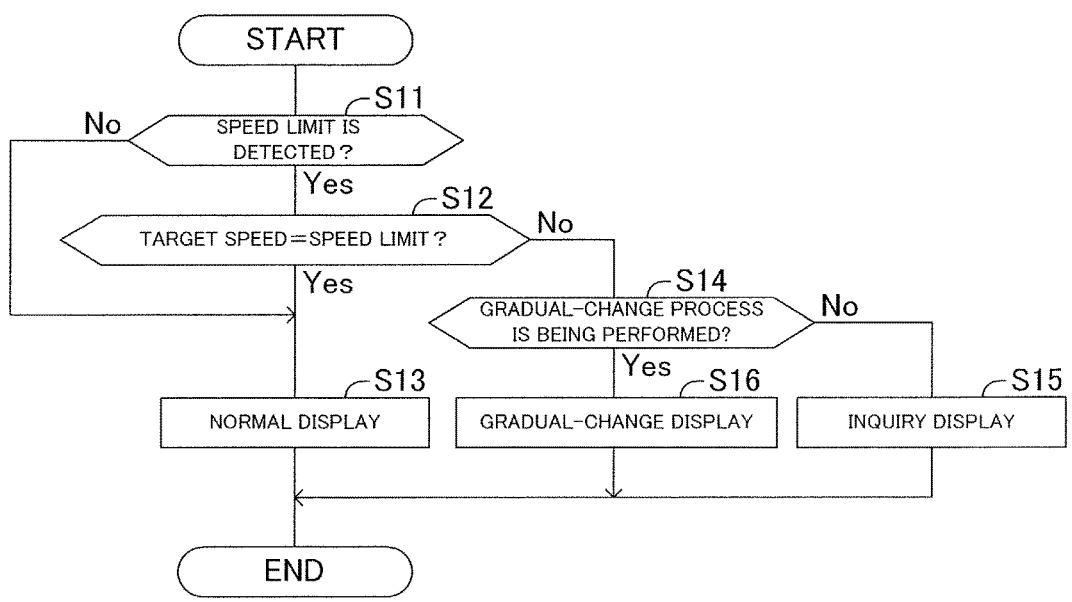
FIG. 4 is a flowchart illustrating a display control routine.

FIG. 4 illustrates a display control routine including the above-described processes for switching the display screen. When the mode for implementing the RSA-ACC (including the RSA-CC as described above) is selected, the driving support ECU 10 repeats the display control routine every time a predetermined calculation cycle elapses.

When the display control routine is started, at step S11, the driving support ECU 10 determines whether or not the speed limit has been detected, that is, whether the speed limit detection ECU 20 has recognized the speed limit of the road on which the own vehicle is traveling. When the speed limit has been detected by the speed limit detection ECU 20 (S11:Yes), at step S12, the driving support ECU 10 determines whether or not the current target speed is equal to the current speed limit.

When the target speed is equal to the speed limit (S12: Yes), at step S13, the driving support ECU 10 transmits the information on the target speed and a normal display command to the meter ECU 50. Therefore, the meter ECU 50 displays the normal display screen D1 including the target speed on the display device 51.

Figure 6:
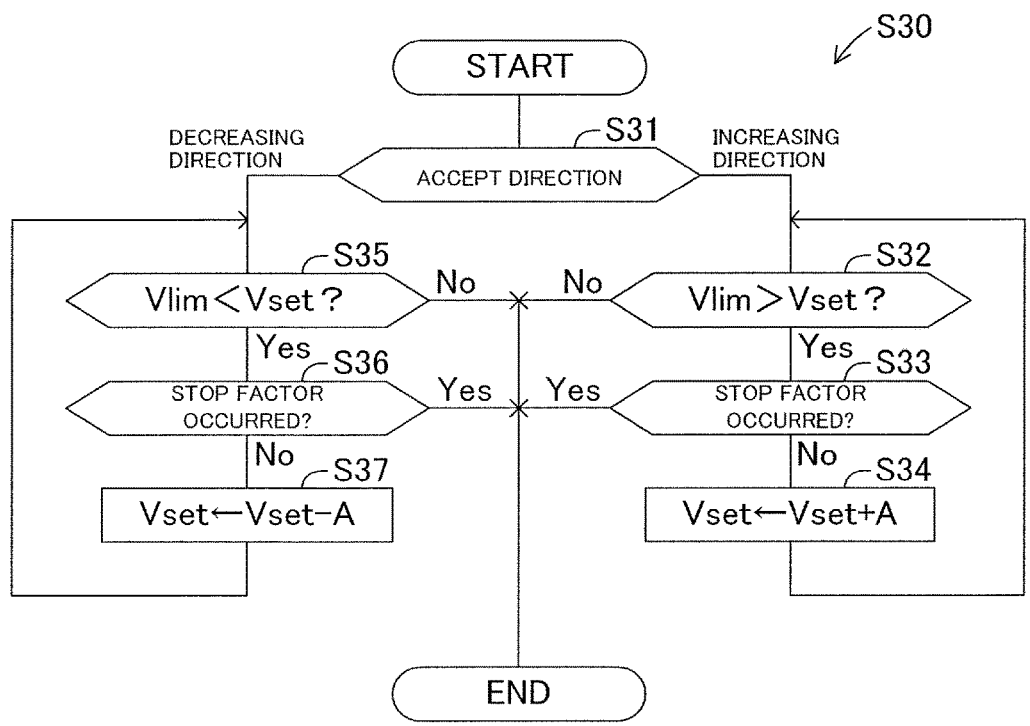
FIG. 6 is a flowchart illustrating an accept process subroutine.

On the other hand, when the target speed is not equal to the speed limit (S12:No), at step S14, the driving support ECU 10 determines whether or not the gradual-change process is being performed, that is, whether or not the target speed is being changed toward the speed limit gradually. As described later, the driving support ECU 10 executes a target speed setting routine in parallel with the display control routine. A loop of steps S32 to S34 or a loop of steps S35 to S37 in the target speed setting routine (the accept process subroutine: FIG. 6) corresponds to the gradual-change process. Therefore, if the processes of the loop of steps S32 to S34 or the processes of the loop of steps S35 to S37 in the target speed setting routine are being executed, the driving support ECU 10 makes a "Yes" determination at step S14. If not, the driving support ECU 10 makes a "No" determination at step S14.

When the gradual-change process is not being performed (S14:No), at step S15, the driving support ECU 10 transmits information on the current target speed and the current speed limit, and the inquiry display command to the meter ECU 50. Therefore, the meter ECU 50 displays on the display device 51 the inquiry display screen D2 including the target speed, the speed limit, and the accept direction mark. In this manner, the driver is notified that the target speed and the speed limit are different from each other (the driver is notified of the suggestion for setting the target speed to the speed limit).

Further, the target speed displayed on the inquiry display screen D2 is changed every time the driver changes (increases or decreases) the target speed using the cruise operating unit 70. Therefore, the current target speed is displayed on the inquiry display screen D2 in real time. The meter ECU 50 determines the accept direction (the direction of the arrow) to be indicated by the accept direction mark, based on the target speed and the speed limit. Alternatively, the driving support ECU 10 may transmit the accept direction to the meter ECU 50.

When the gradual-change process is being performed (S14:Yes), at step S16, the driving support ECU 10 transmits the information on the current target speed and the current speed limit, and the gradual-change display command, to the meter ECU 50. Therefore, the meter ECU 50 displays the gradual-change display screen D3 including the target speed and the speed limit on the display device 51. The target speed displayed on the gradual-change display screen D3 corresponds to a "first display value (gradual-change target speed displayed value)" in the present invention.

Further, when the speed limit has not been detected (S11:No), the driving support ECU 10 advances the process to step S13. In this case, the normal display screen D1 is displayed on the display device 51.

When the driving support ECU 10 has completed any one of the processes of step S13, S15 or S16, it tentatively ends the display control routine. The driving support ECU 10 repeats the display control routine every time the predetermined calculation cycle elapses. Therefore, when the target speed and the speed limit are different from each other, an inquiry is made to the driver as to whether or not to permit the speed limit to be set as the target speed. Further, when the accept operation by the driver is detected, the driver is informed of the target speed which gradually changes toward the speed limit.

It should be noted that the target speed displayed on the display device 51 is a value in real time of the target speed which is set in the target speed setting routine described later, and the speed limit displayed on the display device 51 is the latest speed limit detected by the speed limit detection ECU 20.

Figure 5:
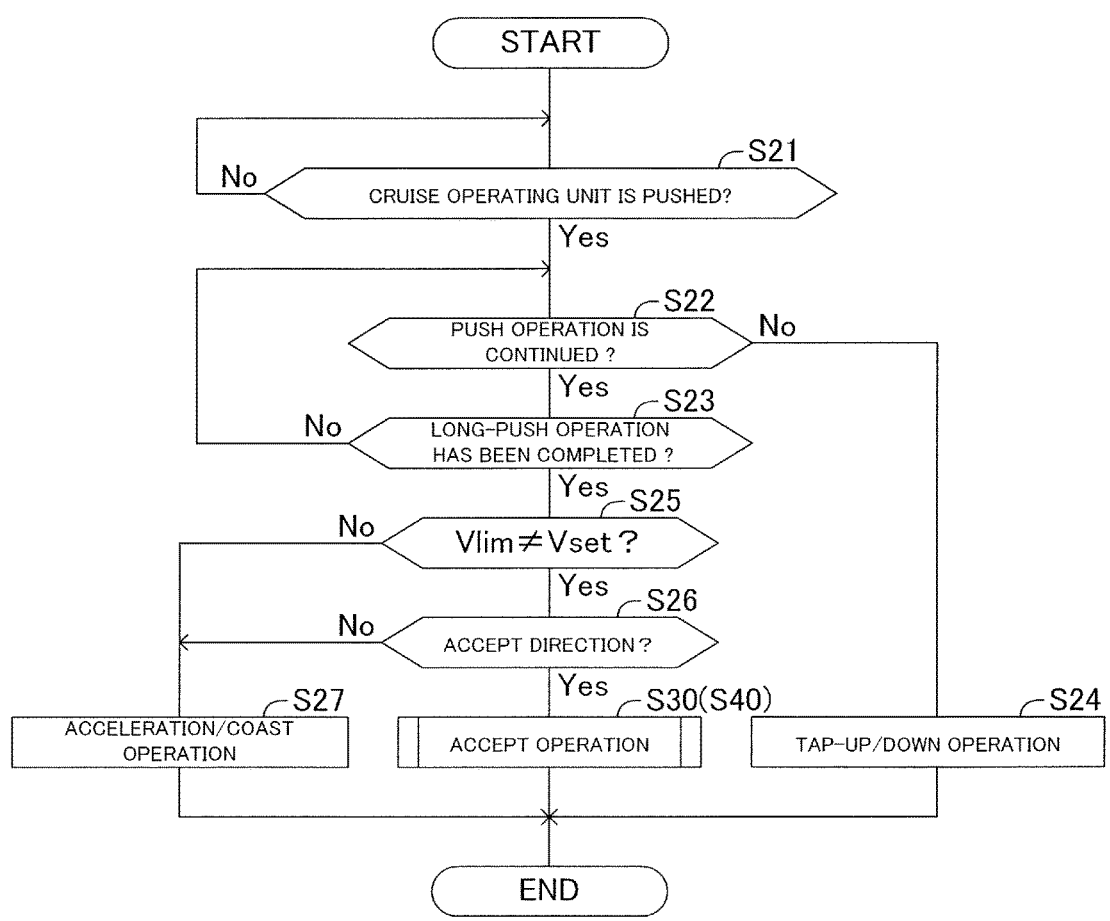
FIG. 5 is a flowchart illustrating a target speed setting routine.

Next, the target speed setting routine will be described. FIG. 5 illustrates the target speed setting routine executed by the driving support ECU 10. When the mode for executing the RSA-ACC is selected, the driving support ECU 10 executes the target speed setting routine every time the predetermined calculation cycle elapses, in parallel with the above-described display control routine.

When the target speed setting routine is started, the driving support ECU 10 determines whether or not the cruise operating unit 70 is being pushed at step S21. Here, the driving support ECU 10 determines whether or not either one of the operation in the upward direction (ON operation of the resume/speed-increasing switch 73) and the operation in the downward operation (ON operation of the set/speed-reduction switch 74) is being performed. The operation in the upward direction relates to the setting of the target speed, and the operation in the downward relates to the setting of the target speed.

The driving support ECU 10 repeats the determination at step S21 every time the predetermined calculation cycle elapses, and waits until the push operation of the cruise operating unit 70 is detected. Upon detecting the push operation of the cruise operating unit 70 (S21: Yes), the driving support ECU 10 determines whether or not the push operation of the cruise operating unit 70 is being continued at step S22. When the push operation of the cruise operating unit 70 is being continued, at step S23, the driving support ECU 10 determines whether or not the push operation of the cruise operating unit 70 has been completed/confirmed as the long-push operation. In other words, the driving support ECU 10 measures a duration time (the ON-duration time of the resume/speed-increasing switch 73 or the set/speed-reduction switch 74) for which the cruise operating unit 70 is being pushed. Thereafter, the driving support ECU 10 determines whether or not the ON-duration time is equal to or longer than a predetermined long-push completion time.

When the push operation of the cruise operating unit 70 has not been completed/confirmed as the long-push operation (S23:No), the driving support ECU 10 returns the process to step S22 and repeats the above-described process every time a predetermined calculation cycle elapses. If the push operation of the cruise operating unit 70 is terminated before the long-push operation is completed (S22:No), that is, if the operation of the cruise operating unit 70 is the short-push operation, at step S24, the driving support ECU 10 regards/treats the operation as the tap-up operation or the tap-down operation. In this case, when the operation direction of the cruise operating unit 70 is upward, the driving support ECU 10 regards/treats the operation as the tap-up operation to increase the target speed by the predetermined speed width/amount (for example, 1 km/h). On the other hand, when the operation direction of the cruise operating unit 70 is downward, the driving support ECU 10 regards/treats the operation as the tap-down operation to decrease the target speed by the predetermined speed width/amount (for example, 1 km/h).

On the other hand, at step S23, if the duration of time for which the push operation of the cruise operating unit 70 continues is equal to or longer than the long-push completion time, that is, when the push operation of the cruise operating unit 70 has been completed/confirmed as the long-push operation, the driving support ECU 10 advances the process to step S25. At step S25, the driving support ECU 10 reads the speed limit detected by the speed limit detection ECU 20, and determines whether or not the speed limit and the current target speed are different from each other. Hereinafter, the latest speed limit detected by the speed limit detection ECU 20 is referred to as a "detected speed limit Vlim". Further, the current target speed is referred to as a "target speed Vset".

When the detected speed limit Vlim and the target speed Vset are different from each other (S25:Yes), at step S26, the driving support ECU 10 determines whether or not the operation direction of the cruise operating unit 70 is the accept direction. As described above, the accept direction is the direction which is indicated by the accept direction mark displayed on the inquiry display screen D2. In the case where the detected speed limit Vlim is higher than the target speed Vset, the accept direction is the upward direction. On the other hand, in the case where the detected speed limit Vlim is lower than the target speed Vset, the accept direction is the downward direction. That is, the accept direction is the same direction as the operation direction for bringing the target speed closer to the detected speed limit Vlim using the cruise operating unit 70.

When the detected speed limit Vlim is equal to the target speed Vset (S25:No), the driving support ECU 10 advances the process to step S27. Further, when the operation direction of the cruise operating unit 70 is not the accept direction (S26:No), the driving support ECU 10 advances the process to step S27. At step S27, the driving support ECU 10 regards/treats the push operation (long-push operation) of the cruise operating unit 70 as the acceleration operation or the coast operation to gradually increase or decrease the target speed from the current value (Vset).

In this case, when the operation direction of the cruise operating unit 70 is the upward direction, the driving support ECU 10 regards/treats the operation as the acceleration operation. Then, the driving support ECU 10 increases the target speed every time the predetermined cycle elapses, in a period which starts from a time point at which the long-push operation has been completed/confirmed and in which the push operation of the cruise operating unit 70 is being continued (in a period until the push operation of the cruise operating unit 70 is not detected). For example, the driving support ECU 10 gradually increases the target speed at/with a predetermined speed interval (such as 80 km/h→85 km/h→90 km/h . . . ) every time a certain constant time elapses.

When the operation direction of the cruise operating unit 70 is the downward direction, the driving support ECU 10 regards/treats the operation as the coast operation. Then, the driving support ECU 10 decreases the target speed every time the predetermined cycle elapses, in a period which starts from a time point at which the long-push operation has been completed and in which the push operation of the cruise operating unit 70 is being continued (in a period until the push operation of the cruise operating unit 70 is not detected). For example, the driving support ECU 10 gradually decreases the target speed at/with a predetermined speed interval (such as 80 km/h→75 km/h→70 km/h . . . ) every time a certain period of time elapses.

The target speed set by the coast operation and the acceleration operation is a multiple of 5 ("5" in this embodiment, but not limited to this value). Therefore, when the target speed (initial target speed) at the time of starting the increasing adjustment (or the decreasing adjustment) is not a multiple of 5, a multiple of 5 closest to the initial target speed is set as the target speed. For example, when the coast operation is detected in a situation in which the target speed is 92 km/h, the driving support ECU 10 decreases the target speed in the following way (92 km/h→90 km/h→85 km/h→ . . . ). Similarly, when the acceleration operation is detected in a situation in which the target speed is 92 km/h, the driving support ECU 10 increases the target speed in the following way (92 km/h→95 km/h→100 km/h→ . . . ).

Further, when it is determined at step S26 that the operation direction of the cruise operating unit 70 is the accept direction, at step S30, the driving support ECU 10 regards/treats the operation of the cruise operating unit 70 as the accept operation to perform the following processes. The processes at step S30 are executed according to the accept process subroutine shown in FIG. 6.

When the accept process subroutine (S30) is started, at step S31, the driving support ECU 10 determines which the operation direction of the cruise operating unit 70 for the accept operation (i.e., "accept direction") is. When the accept direction is the direction for increasing the target speed, the driving support ECU 10 advances the process to step S32. On the other hand, when the accept direction is the direction for decreasing the target speed, the driving support ECU 10 advances the process to step S35.

At step S32, the driving support ECU 10 determines whether or not the detected speed limit Vlim is higher than the current target speed Vset. When a determination at step S32 is firstly made after this routine starts to be executed, a "Yes" determination is made. When the detected speed limit Vlim is higher than the target speed Vset, the driving support ECU 10 determines whether or not a cause/factor for stopping the increase in the target speed has occurred at step S33. Hereinafter, this cause/factor is referred to as "stop factor". In the present embodiment, the stop factor is a new operation of the cruise operating unit 70. In this case, since a termination operation after the accept operation (i.e., an operation for terminating the push operation after the long-push operation has been completed) is included in (or a part of) the accept operation, this termination operation is not considered/regarded as the above-described new operation.

When the stop factor has not been detected, the driving support ECU 10 increases the target speed by a predetermined amount A at step S34. That is, the driving support ECU 10 sets, as a new target speed Vset, a value (=Vset+A) obtained by adding the predetermined amount A (>0) to the current target speed Vset. In the present embodiment, the predetermined amount A is 5 km/h. When the process at step S34 has been completed, the driving support ECU 10 returns the process to step S32 to repeat the above-described processes. In this case, the loop of the processes of steps S32-S34 is repeated every time a predetermined cycle T elapses. For example, the cycle T is 0.7 second.

While the loop of the processes of steps S32-S34 is repeated, the driving support ECU 10 increases the target speed Vset by the predetermined amount A (for example, 5 km/h) every T seconds (for example, 0.7 second). By repeating the loop of the processes in this way, the target speed Vset is gradually increased toward the detected speed limit Vlim. For example, in a case where the target speed Vset at a time point at which the accept operation has just been detected is 80 km/h and the detected speed limit at that time point is 100 km/h, the target speed Vset is increased as follows: 80 km/h→85 km/h→90 km/h→95 km/h→100 km/h. If the target speed Vset (initial value) at a time point at which the target speed Vset starts to be increased is not a multiple of 5, one of multiples of 5 closest to the initial value is set as the target speed Vset only when the target speed is firstly increased (for example, 83 km→85 km/h→90 km/h). The target speed Vset when it is increased at the second time and thereafter becomes a multiple of 5.

The driving support ECU 10 transmits the gradual-change display command, and the information on the target speed Vset and the detected speed limit Vlim to the meter ECU 50 every time the target speed Vset is increased at step S34. The meter ECU 50 changes the target speed Vset (the value of the target speed Vset) displayed on the gradual-change display screen D3 each time the information is received. Further, if the detected speed limit Vlim is changed, the meter ECU 50 changes the value of the detected speed limit Vlim displayed on the gradual-change display screen D3 each time the information is received. The value of the target speed Vset displayed on the gradual-change display screen D3 corresponds to the "first display value (gradual-change target speed displayed value)" of the present invention.

When the new operation of the cruise operating unit 70 (i.e., the stop factor) has not been detected, and thus, the target speed Vset reaches the detected speed limit Vlim (S32:No), the driving support ECU 10 terminates the accept process subroutine, i.e., the process of step S30 in the target speed setting routine (FIG. 5) which is the main routine. At this time, the target speed setting routine is tentatively terminated. The driving support ECU 10 repeats the target speed setting routine every time the predetermined short calculation cycle elapses. Therefore, the process is resumed to be executed from step S21.

When the operation of the cruise operating unit 70 is detected while the loop of the processes of steps S32-S34 is being executed in the accept process subroutine (S33:Yes), the accept process subroutine is terminated at that time. Thereafter, the target speed setting routine is resumed. When the operation of the cruise operating unit 70 is detected at step S33, the driving support ECU 10 stores information indicating that the operation of the cruise operating unit 70 has been performed, and then, resumes the target speed setting routine. Therefore, when resuming the target speed setting routine (FIG. 5), the driving support ECU 10 makes a "Yes" determination at step S21. Therefore, it is possible to use the target speed Vset (the final value of the target speed Vset) at the time of terminating the accept process subroutine as the initial value to thereby set the target speed using the initial value in response to the operation of the cruise operating unit 70.

The target speed Vset which is set in response to the operation of the cruise operating unit 70 is displayed on the display device 51 according to the display control routine. This target speed Vset displayed on the display device 51 (i.e., the target speed which is adjusted in response to the operation of the cruise operating unit 70) corresponds to the "second display value (or adjusted-and-displayed target speed value)" of the present invention. In this case, since the target speed Vset is different from the detected speed limit Vlim, the target speed Vset is displayed on the inquiry display screen D2. The driver can set a desired target speed by the operation of the cruise operating unit 70 while watching the inquiry display screen D2.

On the other hand, when it is determined at step S31 that the accept direction is the direction for decreasing the target speed, the driving support ECU 10 determines whether or not the detected speed limit Vlim is less than the current target speed Vset, at step S35. When a determination at step S35 is firstly made after this routine starts to be executed, a "Yes" determination is made. When the detected speed limit Vlim is lower than the target speed Vset, the driving support ECU 10 determines whether or not a stop factor for stopping the decrease in the target speed has occurred at step S36. In the present embodiment, this stop factor is a new operation of the cruise operating unit 70. In this configuration, since a termination operation after the accept operation (i.e., terminating the push operation after the long-push operation has been completed) is included in (or a part of) the accept operation, this termination operation is not considered/ regarded as the above-described new operation.

When the stop factor has not been detected, at step S37, the driving support ECU 10 decreases the target speed by the predetermined amount A. That is, the driving support ECU 10 sets, as a new target speed Vset, a value (Vset-A) obtained by subtracting the predetermined amount A (>0) from the current target speed Vset. This predetermined amount A is the same value as the predetermined amount for increasing the target speed (i.e., 5 km/h in the present embodiment). When the process at step S37 has been completed, the driving support ECU 10 returns the process to step S35, and repeats the above-described processes. In this case, the loop of the processes of steps S35-S37 is also repeated every time the predetermined cycle T elapses which is the same as the cycle when increasing the target speed.

While the loop of the processes of steps S35-S37 is repeated, the driving support ECU 10 decreases the target speed Vset by the predetermined amount A (for example, 5 km/h) every time T sec. (for example, 0.7 sec.) elapses. By performing the routine in this way, the target speed Vset is gradually decreased toward the detected speed limit Vlim.

For example, when the target speed Vset when the accept operation has been detected is 100 km/h and the detected speed limit at that time is 80 km/h, the target speed Vset is decreased as follows: 100 km/h→95 km/h→90 km/h→85 km/h→80 km/h. If the target speed Vset (initial value) at a time point at which the target speed Vset starts to be decreased is not a multiple of 5, one of multiples of 5 closest to the initial value is set as the target speed Vset only when the target speed is firstly decreased (for example, 98 km→95 km/h→90 km/h). The target speed Vset when it is decreased at the second time and thereafter becomes a multiple of 5.

The driving support ECU 10 transmits the gradual-change display command and the information on the target speed Vset and the detected speed limit Vlim to the meter ECU 50 every time the target speed Vset is decreased at step S37. The meter ECU 50 changes the target speed Vset (the value of the target speed Vset) displayed on the gradual-change display screen D3 every time the information is received. If the detected speed limit Vlim has been changed, the meter ECU 50 changes the value of the detected speed limit Vlim displayed on the gradual-change display screen D3 each time the information is received. The value of the target speed Vset displayed on the gradual-change display screen D3 corresponds to the "first display value (or gradual-change target speed displayed value)" of the present invention.

When the new operation of the cruise operating unit 70 (i.e., the stop factor) has not been detected, and thus, the target speed Vset reaches the detected speed limit Vlim (S35:No), the driving support ECU 10 terminates the accept process subroutine. At this time, the target speed setting routine is tentatively terminated. The driving support ECU 10 repeats the target speed setting routine every time the predetermined short calculation cycle elapses. Therefore, the process is resumed to be executed from step S21.

When the operation of the cruise operating unit 70 is detected while the loop of the processes of steps S35-S37 is being executed in the accept process subroutine (S36: Yes), the accept process subroutine is terminated at that time. Thereafter, the target speed setting routine is resumed. When the operation of the cruise operating unit 70 is detected at step S36, the driving support ECU 10 stores information indicating that the operation of the cruise operating unit 70 has been performed, and then, resumes the target speed setting routine.

Therefore, when resuming the target speed setting routine, the driving support ECU 10 makes a "Yes" determination at step S21. Therefore, it is possible to use the target speed Vset (the final value of the target speed Vset) at the time of terminating the accept process subroutine as the initial value to thereby set the target speed using the initial value in response to the operation of the cruise operating unit 70. The target speed Vset which has been set in response to the operation of the cruise operating unit 70 is displayed on the display device 51 according to the display control routine. This target speed Vset displayed on the display device 51 (i.e., the target speed which is adjusted in response to the operation of the cruise operating unit 70) corresponds to the "second display value (or adjusted-and-displayed target speed value)" of the present invention.

The reason why the target speed is gradually changed toward the detected speed limit Vlim will next be described.

As described above, according to the driving support/ assist system for implementing the RSA-ACC, when the accept operation by the driver is detected, the speed limit recognized by the speed limit detection ECU 20 is set as the target speed for the constant speed control. However, the speed limit detection ECU 20 may erroneously recognize the speed limit. If that happens, the target speed may be set in a manner which is not along with the intention of the driver. Therefore, the driver has to modify an erroneously-set target speed (which is equal to the erroneously-recognized speed limit) to a correct value by using the cruise operating unit 70.

Especially, in the present embodiment, since a determination as to whether or not the accept (acceptance-response-operation) has been performed is made based on the long-push operation of the cruise operating unit 70, the erroneously-recognized speed limit may sometimes be set as the target speed. A determination as to whether the long-push operation has been completed/confirmed is finalized when the push operation of the cruise operating unit 70 continues for the long-push completion time or more. However, while the driver performs the push operation (that is, in a period until the duration time of the push operation of the cruise operating unit 70 reaches the long-push completion time), a situation may occur in which the speed limit recognized by the speed limit detection ECU 20 changes from a first speed limit to a second speed limit. When the target speed is set to the second speed limit, and if the second speed limit is the correct speed limit, no problem arises. In contrast, if the second speed limit is the erroneously-recognized speed limit, the target speed is set to a value which is not along with the intention of the driver.

For example, as illustrated in FIG. 7A showing a comparative example, a situation is considered in which the current target speed Vset is 80 km/h, the speed limit Vlim recognized by the speed limit detection ECU 20 is 100 km/h, and the driver attempts to start the upward long-push operation of the cruise operating unit 70 at the time t1 in order to increase the target speed to the speed limit. Assuming that the speed limit detection ECU 20 erroneously recognizes the speed limit as 160 km/h at the time t2 while the driver performs the long-push operation, the target speed is changed to 160 km/h at the time t3 when the long-push operation has been detected (at the time when the duration time of the push operation has reached the long-push completion time). In this scenario, the target speed is set in a manner far from the intention of the driver (i.e., the target speed is set to a value which is very different from a value desired by the driver).

If the above situation happens, it is necessary for the driver to perform a correcting operation(s) to decrease the target speed from 160 km/h as the initial value toward 100 km/h. In this case, an amount required for adjustment of the target speed is 60 km/h (=160-100). Therefore, a required operation amount of the operating unit (the number of short-push operations or the long-push operation time) is large, which is burdensome for the driver and causes inconvenience to the driver.

In view of the above, according to the present embodiment, as illustrated in FIG. 7B, when the log-push operation in the accept direction has been detected (time t3), the target speed is gradually increased from the target speed at that time (time t3) to the detected speed limit Vlim recognized by the speed limit detection ECU 20 (steps S32-S34 in FIG. 6). This target speed is informed to the driver using the gradual-change display screen D3 displayed on the display device 51. As a result, before the target speed reaches the erroneously-recognized speed limit, it is possible to have the driver notice that the target speed may be set to a value which is not along with the intention of the driver.

When the driver watches the target speed displayed on the gradual-change display screen D3 and notices that the target speed is not along with his/her intention (that is, the target speed exceeds the speed limit recognized by himself/herself), the driver uses the cruise operating unit 70 to perform a correcting operation(s) for correcting the target speed. In this case, the driving support ECU 10 terminates the gradual-change process for gradually changing the target speed (step S33:Yes), and sets the target speed in response to the operation of the cruise operating unit 70.

For example, as illustrated in FIG. 7C, when the tap-down operation of the cruise operating unit 70 has been detected at the time t4, the gradual-change process for gradually changing the target speed is terminated at that time t4. Thereafter, the target speed is decreased in response to the number of the tap-down operations from the final value (105 km/h in this example) to which the target speed has been gradually changed up to the present time. Therefore, the driver can use, as an initial value, the value of the target speed (105 km/h in this example) at the time at which he/she has noticed that the target speed is not along with his/her intention, in order to perform the correcting operation(s) to decrease the target speed to 100 km/h. Therefore, an amount of operation time and work of the cruise operating unit 70 required for correcting the target speed can be reduced. This is convenient for the driver. Further, it is possible to shorten a time period for which the running speed of the own vehicle exceeds the speed limit against the intention of the driver.

In order to explain the effect of the present embodiment in an easy-to-understand manner, in the above-described example, the speed limit is erroneously recognized. However, the driving support ECU 10 cannot determine whether or not the speed limit is erroneously recognized. Therefore, in the present embodiment, when setting the detected speed limit as the target speed, the driving support ECU 10 gradually changes the target speed toward the detected speed limit.

Further, the above-described example shows the situation in which the speed limit recognized by the speed limit detection ECU 20 is changed during the long-push operation of the cruise operating unit 70. However, the embodiment can be applied to a situation other than that. Namely, even if the speed limit is erroneously recognized before the driver starts the long-push operation of the cruise operating unit 70, the target speed is gradually changed as described above.

For example, the driver may watch and recognize a road sign ahead of the own vehicle to thereby perform the accept operation of the cruise operating unit 70. If the speed limit is erroneously recognized in this situation, the target speed is set to a value which is not along with the intention of the driver. According to the present embodiment, by displaying the gradual-change display screen D3, it is possible to have the driver notice that the target speed is set to a value which is not along with the intention of the driver.

The present embodiment changes the target speed gradually toward the detected speed limit Vlim by the loop of the processes of steps S32-S34 or the loop of the processes of steps S35-S37. The gradual-change process is terminated when the target speed Vset is equal to or higher than the detected speed limit Vlim at step S32 or when the target speed Vset is equal to or lower than the detected speed limit Vlim at step S35. Accordingly, when the detected speed limit Vlim is changed during the gradual-change process for gradually changing the target speed, the termination timing of the gradual-change process is determined based on the changed speed limit Vlim (the latest detected speed limit). Therefore, the gradual-change process can be terminated at an appropriate timing.

For example, in a situation as illustrated in FIG. 8A, while the target speed is gradually being changed toward the detected speed limit 160 km/h, the detected speed limit Vlim is changed to 130 km/h. In this situation, the gradual-change process is terminated (S32:No) at the time (time t5) at which the target speed Vset which is increased by the gradual-change process has reached 130 km/h. Further, in a situation as illustrated in FIG. 8B, while the target speed is gradually being changed toward the detected speed limit 160 km/h, the detected speed limit Vlim is changed to a value (for example, 80 km/h) lower than the target speed Vset. In this situation, when the detected speed limit Vlim has changed to 80 km/h, the target speed Vset already exceeds the detected speed limit Vlim. In this case, the gradual-change process is terminated (S32:No) at the time (time t6) at which the speed limit of 80 km/h has been detected.

Further, in a situation as illustrated in FIG. 8C, while the target speed is gradually being changed toward the detected speed limit of 160 km/h, the speed limit detection ECU 20 goes into a state in which it fails to recognize the speed limit. In this case, the driving support ECU 10 cannot compare the target speed with the detected speed limit. Thus, a "No" determination is made at step S32. Accordingly, the gradual-change process is terminated at the time (time t7) at which the speed limit detection ECU 20 has failed to recognize the speed limit.

For example, when the own vehicle turns right or left at an intersection, there is a possibility that the speed limit changes. In addition, if the travel distance of the own vehicle after previously detecting a speed limit sign (the travel distance of the own vehicle without detecting the next speed limit sign) exceeds a predetermined reliability determination distance, there is a possibility that the speed limit has changed. Further, when an abnormality of the in-vehicle camera 21 or the navigation apparatus 22 is detected, it becomes impossible to properly detect the speed limit. In the above situations, the reliability of the speed limit recognized by the speed limit detection acquisition ECU 20 is low.

Therefore, the speed limit detection ECU 20 determines whether a degree of reliability of the recognized speed limit is lower than a reference level every time a predetermined calculation cycle elapses. When it is determined that the degree of reliability of the recognized speed limit is lower than the reference level, the speed limit detection ECU 20 transmits to the driving support ECU 10 information indicating that the speed limit has not been recognized.

When the driving support ECU 10 receives the information indicating that the speed limit has not been recognized from the speed limit detection ECU 20 (at the time t7) during the execution of the gradual-change process, the driving support ECU 10 terminates the gradual-change process. FIG. 8C illustrates an example in which the speed limit detection ECU 20 fails to recognize the speed limit when the target speed Vset is changed to 105 km/h, and therefore, the gradual-change process is terminated.

In the above manner, the driver can use, as an initial value, the target speed Vset at the time of terminating the gradual-change process to perform the correcting operation(s) for correcting the target speed from this initial value to a desired value. Accordingly, an amount of operation time and work of the cruise operating unit 70 required for correcting the target speed can be reduced, and therefore, the operability for the driver is good.

The above-described example is an example in the case of the upward accept operation (that is, an example of the accept operation when the detected speed limit Vlim is higher than the target speed Vset). Similarly, the present embodiment can be applied to the downward accept operation (that is, the accept operation when the detected speed limit Vlim is lower than the target speed Vset).

For example, as illustrated in FIG. 9A showing a comparative example, a situation is considered in which the current target speed Vset is 100 km/h, the detected speed limit Vlim recognized by the speed limit detection ECU 20 is 80 km/h, and the driver attempts to start the downward long-push operation of the cruise operating unit 70 at the time t1 in order to decrease the target speed to the speed limit. Assuming that the speed limit detection ECU 20 erroneously recognizes that the speed limit is 40 km/h at the time t2 while the driver performs the long-push operation, the target speed is changed to 40 km/h at the time t3 at which the long-push operation has been detected (the duration time of the push operation has reached the long-push completion time). In this scenario, the target speed is set in a manner far from the intention of the driver (i.e., the target speed is set to a value which is very different from a value desired by the driver).

If the above situation happens, it is necessary for the driver to perform a correcting operation(s) to increase the target speed from 40 km/h as the initial value toward 80 km/h. In this case, an amount required for adjustment of the target speed is 40 km/h (=80-40). Therefore, a large amount of operation time and work (the number of short-push operations or the long-push operation time) of the operating unit 70 is required, which is burdensome for the driver and causes inconvenience to the driver.

In view of the above, according to the present embodiment, as illustrated in FIG. 9B, when the log-push operation in the accept direction has been detected (time t3), the target speed is gradually decreased from the target speed at that time (time t3) to the detected speed limit Vlim recognized by the speed limit detection ECU 20 (steps S35-S37 in FIG. 6). This target speed is informed to the driver using the gradual-change display screen D3 displayed on the display device 51. As a result, before the target speed reaches the erroneously-recognized speed limit, it is possible to have the driver notice that the target speed may be set to a value which is not along with the intention of the driver.

When the driver watches the target speed displayed on the gradual-change display screen D3 and notices that the target speed is not along with his/her intention (that is, the target speed is less than the speed limit recognized by himself/herself), the driver uses the cruise operating unit 70 to perform a correcting operation(s) for correcting the target speed. In this case, the driving support ECU 10 terminates the gradual-change process for gradually changing the target speed (step S36:Yes), and sets the target speed in response to the operation of the cruise operating unit 70.

For example, as illustrated in FIG. 9C, when the tap-up operation of the cruise operating unit 70 has been detected at the time t4, the gradual-change process for gradually changing the target speed is terminated at that time t4. Thereafter, the target speed is increased in response to the number of the tap-up operations from the final value (75 km/h in this example) to which the target speed has been gradually changed up to the present time. Therefore, the driver can use, as an initial value, the value of the target speed (75 km/h in this example) at the time at which he/she has noticed that the target speed is not along with his/her intention, in order to perform the correcting operation(s) to increase the target speed to 80 km/h. Therefore, an amount of operation time and work of the cruise operating unit 70 required for correcting the target speed can be reduced. This is convenient for the driver.

For example, in a situation as illustrated in FIG. 10A, while the target speed is being gradually changed toward the detected speed limit 40 km/h, the detected speed limit Vlim is changed to 60 km/h. In this situation, the gradual-change process is terminated (S35:No) at the time (time t5) when the target speed Vset which is decreased by the gradual-change process has reached 60 km/h.

Further, in a situation as illustrated in FIG. 10B, while the target speed is gradually being changed toward the detected speed limit 40 km/h, the detected speed limit Vlim is changed to a value (for example, 100 km/h) higher than the target speed Vset. In this situation, at the time when the detected speed limit Vlim has changed to 100 km/h, the target speed Vset is already lower than the detected speed limit Vlim. In this case, the gradual-change process is terminated (S35:No) at the time (time t6) when the speed limit of 100 km/h has been detected.

Further, in a situation as illustrated in FIG. 10C, while the target speed is gradually being changed toward the detected speed limit of 40 km/h, the speed limit detection ECU 20 goes into a state in which it fails to recognize the speed limit. In this case, the driving support ECU 10 cannot compare the target speed with the detected speed limit. Accordingly, a "No" determination is made at step S35. The gradual-change process is terminated at the time (time t7) at which the speed limit detection ECU 20 has failed to recognize the speed limit.

Second Embodiment

In the above-described embodiment (hereinafter referred to as the "first embodiment"), when the accept operation has been detected, the target speed Vset starts to be gradually changed from the target speed Vset at the time of detecting the accept operation to the speed limit detected (recognized) by the speed limit detection ECU 20. In addition, the target speed Vset which is gradually changed is displayed on the gradual-change display screen D3. In contrast, according to the second embodiment, when the accept operation has been detected, the speed limit Vlim which has been detected (recognized) by the speed limit detection ECU 20 at that time, is set as the target speed Vset (the target speed used for the constant speed control). On the other hand, a value different from the actual target speed Vset is displayed on the gradual-change display screen D3, that is, a target speed for display which is gradually being changed from the target speed Vset at the time of detecting the accept operation toward the detected speed limit Vlim is displayed.

Hereinafter, in order to distinguish the target speed for display which is displayed on the gradual-change display screen D3 from the target speed Vset for the constant speed control, the target speed for display is referred to as a "display value Vsetd for gradual-change target speed", or is simply referred to as a "display value Vsetd". It should be noted that, in the above-described first embodiment, the display value Vsetd is always equal to the target speed Vset.

Figure 11:
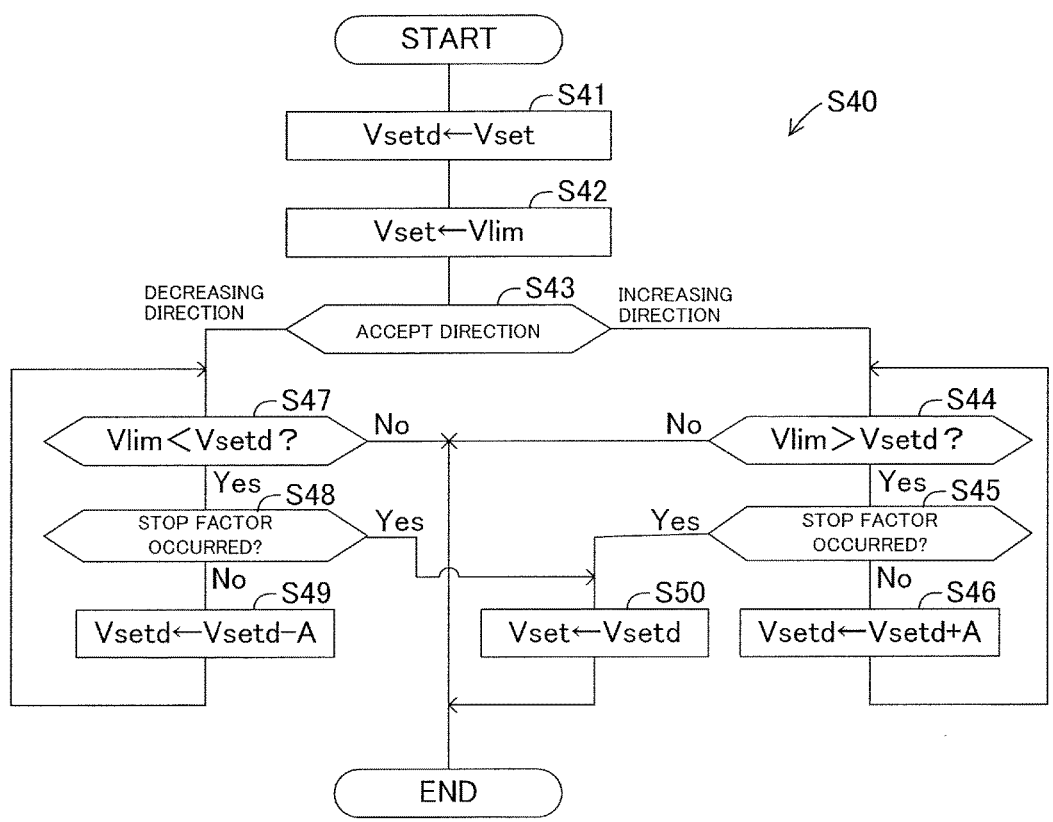
FIG. 11 is a flowchart illustrating an accept process subroutine (second embodiment).

In the second embodiment, the driving support ECU 10 executes an accept process subroutine (S40) illustrated in FIG. 11 in place of the accept process subroutine (S30) in FIG. 6.

When the accept process subroutine in the second embodiment is started, the driving support ECU 10 sets the current target speed Vset as the display value Vsetd displayed on the gradual-change display screen D3 (Vsetd←Vset) at step S41.

Next, at step S42, the driving support ECU 10 sets the target speed Vset to the detected speed limit Vlim (Vset←Vlim). Therefore, at the time when the accept operation has been detected, the detected speed limit Vlim is set as the target speed Vset. The driving support ECU 10 controls the driving force and the braking force of the own vehicle from that time point in such a manner that the vehicle speed of the own vehicle follows (or becomes equal to) the detected speed limit Vlim. It should be noted that, although the own vehicle accelerates (or decelerates) toward the target speed Vset (=Vlim), this acceleration rate is set to be roughly equal to an acceleration rate at which the own vehicle of the first embodiment accelerates while gradually changing the target speed Vset.

Next, at step S43, the driving support ECU 10 determines the accept direction of the cruise operating unit 70. When the accept direction is the direction for increasing the target speed, the driving support ECU 10 advances the process to step S44. On the other hand, when the accept direction is the direction for decreasing the target speed, the driving support ECU 10 advances the process to step S47.

At step S44, the driving support ECU 10 determines whether or not the detected speed limit Vlim is higher than the current display value Vsetd. When a determination at step S44 is firstly made after this routine starts to be executed, a "Yes" determination is made. When the detected speed limit Vlim is higher than the display value Vsetd, the driving support ECU 10 determines whether or not a cause/factor for stopping the increase in the target speed has occurred, at step S45. Hereinafter, this cause/factor is referred to as a "stop factor". In the present embodiment, the stop factor is a new operation of the cruise operating unit 70. In this case, since a termination operation after the accept operation (i.e., an operation for terminating the push operation after the long-push operation has been completed) is included in (or a part of) the accept operation, this termination operation is not considered/regarded as the above-described new operation.

When the stop factor has not been detected, the driving support ECU 10 increases the display value Vsetd by a predetermined amount A at step S46. That is, the driving support ECU 10 sets, as a new display value Vsetd, a value (Vsetd+A) obtained by adding the predetermined amount A (>0) to the current display value Vsetd. In the present embodiment, the predetermined amount A is 5 km/h. When the process at step S46 has been completed, the driving support ECU 10 returns the process to step S44 to repeat the above-described processes. In this case, the loop of the processes of steps S44-S46 is repeated every time a predetermined cycle T elapses. For example, the cycle T is 0.7 second.

While the loop of the processes of steps S44-S46 is repeated, the driving support ECU 10 increases the display value Vsetd by the predetermined amount A (for example, 5 km/h) every T seconds (for example, 0.7 second). At step S46, the driving support ECU 10 transmits to the meter ECU 50 a gradual-change display command, and information on the display value Vsetd and the detected speed limit Vlim each time display value Vsetd is increased. The meter ECU 50 displays the gradual-change display screen D3 displaying the received display value Vsetd and detected speed limit Vlim.

Further, when the speed limit Vlim detected by the speed limit detection ECU 20 is changed during the execution of the loop of the processes of steps S44-S46 or the loop of the processes of steps S47-S49 described later, the driving support ECU 10 sets the target speed Vset to the changed speed limit Vlim.

By repeating the above processes in this way, the display value Vsetd is gradually increased toward the detected speed limit Vlim. For example, when the target speed Vset at the time at which the accept operation has been detected is 80 km/h and the detected speed limit at that time is 100 km/h, the display value Vsetd is increased as follows: 80 km/h→85 km/h→90 km/h→95 km/h→100 km/h. Further, if the display value Vsetd (initial value) at the time of starting of the increase in the display value Vsetd is not a multiple of 5, one of multiples of 5 closest to the initial value is set as the display value Vsetd only when the display value Vsetd is firstly increased (for example, 83 km→85 km/h→90 km/h). The display value Vsetd when it is increased at the second time and thereafter becomes a multiple of 5.

When the new operation of the cruise operating unit 70 (i.e., the stop factor) has not been detected, and thus, the display value Vsetd reaches the detected speed limit Vlim (S44:No), the driving support ECU 10 terminates the accept process subroutine, i.e., the process of step S40 in the target speed setting routine (FIG. 5) which is the main routine. At this time, the target speed setting routine is tentatively terminated. The driving support ECU 10 repeats the target speed setting routine every time the predetermined short calculation cycle elapses. Therefore, the process is resumed to be executed from step S21.

When the operation of the cruise operating unit 70 is detected while the loop of the processes of steps S44-S46 is being executed in the accept process subroutine (S45:Yes), the driving support ECU 10 advances the process to step S50. At step S50, the driving support ECU 10 sets the current display value Vsetd as the target speed. Therefore, the current target speed Vset (=the detected speed limit Vlim) is changed to the current display value Vsetd (Vset←Vsetd).

When the process of step S50 has been completed, the driving support ECU 10 terminates the accept process subroutine. Therefore, the target speed setting routine is tentatively terminated. The driving support ECU 10 repeats the target speed setting routine every time the predetermined calculation cycle elapses. Therefore, the process is resumed from step S21.

When the operation of the cruise operating unit 70 has been detected at step S45, the driving support ECU 10 stores information indicating that the operation of the cruise operating unit 70 has been performed. Therefore, at the time of resuming the target speed setting routine, the driving support ECU 10 makes a "Yes" determination at step S21. Therefore, it is possible to use the target speed Vset (the final value of the display value Vsetd) at the time of terminating the accept process subroutine as the initial value to set the target speed in response to the operation of the cruise operating unit 70.

The target speed Vset which is set in response to the operation of the cruise operating unit 70 is displayed on the display device 51 according to the display control routine. The target speed Vset displayed on the display device 51 (i.e., the target speed which is adjusted in response to the operation of the cruise operating unit 70) corresponds to the "second display value (or adjusted-and-displayed target speed value)" of the present invention. In this case, since the target speed Vset is different from the detected speed limit Vlim, the target speed Vset is displayed on the inquiry display screen D2. The driver can set a desired target speed by the operation of the cruise operating unit 70 while watching the inquiry display screen D2.

On the other hand, when it is determined at step S43 that the accept operation direction is the direction for decreasing the target speed, the driving support ECU 10 determines whether or not the detected speed limit Vlim is less than the display value Vsetd, at step S47. When a determination at step S47 is firstly made after this routine starts to be executed, a "Yes" determination is made. When the detected speed limit Vlim is less than the display value Vsetd, the driving support ECU 10 determines whether or not a factor (stop factor) for stopping the decrease in the target speed has occurred, at step S48. In the present embodiment, this stop factor is a new operation of the cruise operating unit 70.

When the stop factor has not been detected, at step S49, the driving support ECU 10 decreases the display value Vsetd by the predetermined amount A. That is, the driving support ECU 10 sets, as a new display value Vsetd, a value (Vsetd-A) obtained by subtracting the predetermined amount A (>0) from the current display value Vsetd. This predetermined amount A is the same as the value used at step 46, namely, 5 km/h. When the process at step S49 has been completed, the driving support ECU 10 returns the process to step S47, and repeats the above-described processes. In this case, the loop of the processes of steps S47-S49 is also repeated every time the predetermined cycle T elapses which is the same as the cycle when the loop of the processes of steps S44-S46 is executed.

While the loop of the processes of steps S47-S49 is repeated, the driving support ECU 10 decreases the display value Vsetd by the predetermined amount A (for example, 5 km/h) every time T sec. (for example, 0.7 sec.) elapses. At step S49, the driving support ECU 10 transmits to the meter ECU 50 the gradual-change display command, and information on the display value Vsetd and the detected speed limit Vlim each time the display value Vsetd is decreased. The meter ECU 50 displays the gradual-change display screen D3 displaying the received display value Vsetd and detected speed limit Vlim.

By executing the processes in this way, the display value Vsetd is gradually decreased toward the detected speed limit Vlim. For example, when the target speed Vset when the accept operation has been detected is 100 km/h and the detected speed limit at that time is 80 km/h, the display value Vsetd is decreased as follows: 100 km/h→95 km/h→90 km/h→85 km/h→80 km/h. If the display value Vsetd (initial value) at a time point at which the display value Vsetd starts to be decreased is not a multiple of 5, one of multiples of 5 closest to the initial value is set as the display value Vsetd only when the display value Vsetd is firstly decreased (for example, 98 km→95 km/h→90 km/h). The display value Vsetd when it is decreased at the second time and thereafter becomes a multiple of 5.

When the new operation of the cruise operating unit 70 (i.e., the stop factor) has not been detected, and thus, the display value Vsetd reaches the detected speed limit Vlim (S47:No), the driving support ECU 10 terminates the accept process subroutine. Therefore, the process is resumed to be executed from step S21.

When the operation of the cruise operating unit 70 is detected while the loop of the processes of steps S47-S49 is being performed in the accept process subroutine (S48:Yes), the driving support ECU 10 executes step S50 as described above, and terminates the accept process subroutine. In this case, the driving support ECU 10 stores information indicating that the operation of the cruise operating unit 70 has been performed. Therefore, at the time of resuming the target speed setting routine, the driving support ECU 10 makes a "Yes" determination at step S21. Therefore, it is possible to use the target speed Vset (the final value of the display value Vsetd) at the time of terminating the accept process subroutine as the initial value to thereby set the target speed in response to the operation of the cruise operating unit 70.

According to the second embodiment as described above, when the accept operation has been detected, the display value Vsetd is displayed on the gradual-change display screen D3 in such a manner that the display value Vsetd is gradually changed from the target speed at the present time to the detected speed limit Vlim. Therefore, even when the speed limit is erroneously recognized, it is possible to have the driver notice that the target speed is set to a value which is not along with his/her intention before the display value Vsetd reaches the erroneously-recognized speed limit. Therefore, the driver can use, as an initial value, the target speed at the time at which he/she noticed that the target speed was set to a value which is not along with his/her intention, so as to perform the correcting operation(s) for adjusting the target speed from the initial value. Therefore, an amount of operation time and work of the cruise operating unit 70 required for correcting the target speed can be reduced. As a result, the vehicle traveling control apparatus which is convenient for the driver is provided.

Further, when the operation of the cruise operating unit 70 is performed during the execution of the gradual-change process, the display value Vsetd at that time is set to the target speed Vset (S50). Therefore, the target speed modified by the cruise operating unit 70 can be set to the target speed for the constant speed control as it is. As a result, it is possible to smoothly set a speed desired by the driver as the target speed for the constant speed control. Therefore, it is possible to correct in a short time a situation in which the running speed of the own vehicle exceeds the speed limit against the intention of the driver.

It should be noted that the transition of the display value Vsetd is the same as the transition of the target speed Vset after the time point (time t3) at which the accept operation has been detected in FIGS. 7-10.

Next, modifications that can be applied to the first embodiment and the second embodiment will be described.
<Modifications>

In the above first and second embodiments, when the accept operation has been detected, the target speed (the display value Vsetd in the second embodiment) is gradually changed from the current target speed Vset toward the detected speed limit Vlim. In this modification 1, when the detected speed limit Vlim is changed from a first speed limit Vlim1 to a second speed limit Vlim2 during the accept operation, that is, in a period from a time point at which the push operation in the accept direction is started to a time point at which the long-push completion time passes, a way for setting the target speed is different from each of the ways of the above first and second embodiments, if the following conditions described below are satisfied. Hereinafter, when this modification is applied to the first embodiment, the target speed in the present modification refers to the target speed Vset. On the other hand, when this modification is applied to the second embodiment, the target speed in the present modification refers to the display value Vsetd.

If the following conditions described below are not satisfied, the driving support ECU 10 is configured to gradually change the target speed from the current target speed Vset toward the detected speed limit Vlim in the same way as the above first and second embodiments.

Condition 1: the accept direction of the cruise operating unit 70 is the upward direction, and the following relationship is established between the first speed limit Vlim1 at the time of starting the long-push operation, the second speed limit Vlim2 at the completion of the long-push operation, and the current target speed Vset.

Vlim2>Vlim1>Vset

The driving support ECU 10 determines whether or not the condition 1 is satisfied. If the condition 1 is satisfied, the driving support ECU 10 starts to gradually increase the target speed from the first speed limit Vlim1 to the second speed limit Vlim2 when the accept operation of the cruise operating unit 70 has been detected.

For example, as illustrated in FIG. 12A, a situation is considered in which the target speed Vset is 80 km/h, the first speed limit Vlim1 is 100 km/h, and the second speed limit Vlim2 is 160 km/h. In this situation, when the upward accept operation of the cruise operating unit 70 has been detected, the driving support ECU 10 increases the target speed every time the predetermined cycle T elapses as follows: 100 km/h→105 km/h→ . . . →160 km/h. Therefore, even when the speed limit is erroneously recognized during the long-push operation of the cruise operating unit 70 in the accept direction, it is possible to have the driver notice that the speed limit has been erroneously recognized at an earlier timing.

Condition 2: the accept direction of the cruise operating unit 70 is the downward direction, and the following relationship is established between the first speed limit Vlim1 at the time of starting the long-push operation, the second speed limit Vlim2 at the completion of the long-push operation, and the current target speed Vset.

Vlim2<Vlim1<Vset

The driving support ECU 10 determines whether or not the condition 2 is satisfied. If the condition 2 is satisfied, the driving support ECU 10 gradually decreases the target speed from the first speed limit Vlim1 to the second speed limit Vlim2 when the accept operation of the cruise operating unit 70 has been detected.

For example, as illustrated in FIG. 12B, a situation is considered in which the target speed Vset is 100 km/h, the first speed limit Vlim1 is 80 km/h, and the second speed limit Vlim2 is 40 km/h. In this situation, when the downward accept operation of the cruise operating unit 70 has been detected, the driving support ECU 10 decreases the target speed every time the predetermined cycle T elapses as follows: 80 km/h→75 km/h→ . . . →40 km/h. Therefore, even when the speed limit is erroneously recognized during the long-push operation of the cruise operating unit 70 in the accept direction, it is possible to have the driver notice that the speed limit has been erroneously recognized at an earlier timing.

Condition 3: the accept direction of the cruise operating unit 70 is the upward direction, and the following relationship is established between the first speed limit Vlim1 at the time of starting the long-push operation, the second speed limit Vlim2 at the completion of the long-push operation, and the current target speed Vset.

Vlim1>Vlim2>Vset

The driving support ECU 10 determines whether or not the condition 3 is satisfied. If the condition 3 is satisfied, the driving support ECU 10 sets the target speed to the second speed limit Vlim2 when the accept operation of the cruise operating unit 70 has been detected.

Figure 13A:
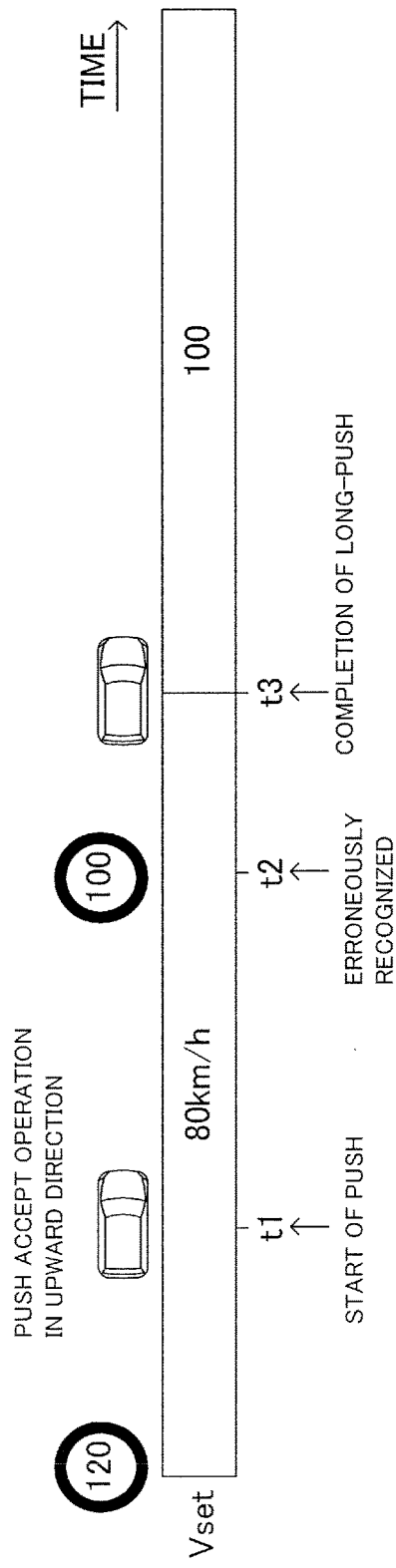
FIG. 13A is a diagram illustrating the change of the target speed in a modified example when the accept operation is performed.

For example, as illustrated in FIG. 13A, a situation is considered in which the target speed Vset is 80 km/h, the first speed limit Vlim1 is 120 km/h, and the second speed limit Vlim2 is 100 km/h. In this situation, when the upward accept operation of the cruise operating unit 70 has been detected, the driving support ECU 10 changes the target speed from 80 km/h to 100 km/h. In such a situation, since an amount of operation time and work of the cruise operating unit 70 for correcting the target speed is low, it is possible to prevent the operation burden of the driver from being increased.

Condition 4: the accept direction of the cruise operating unit 70 is the downward direction, and the following relationship is established between the first speed limit Vlim1 at the time of starting the long-push operation, the second speed limit Vlim2 at the completion of the long-push operation, and the current target speed Vset.

Vlim1<Vlim2<Vset

The driving support ECU 10 determines whether or not the condition 4 is satisfied. If the condition 4 is satisfied, the driving support ECU 10 sets the target speed to the second speed limit Vlim2 when the accept operation of the cruise operating unit 70 has been detected.

Figure 13B:
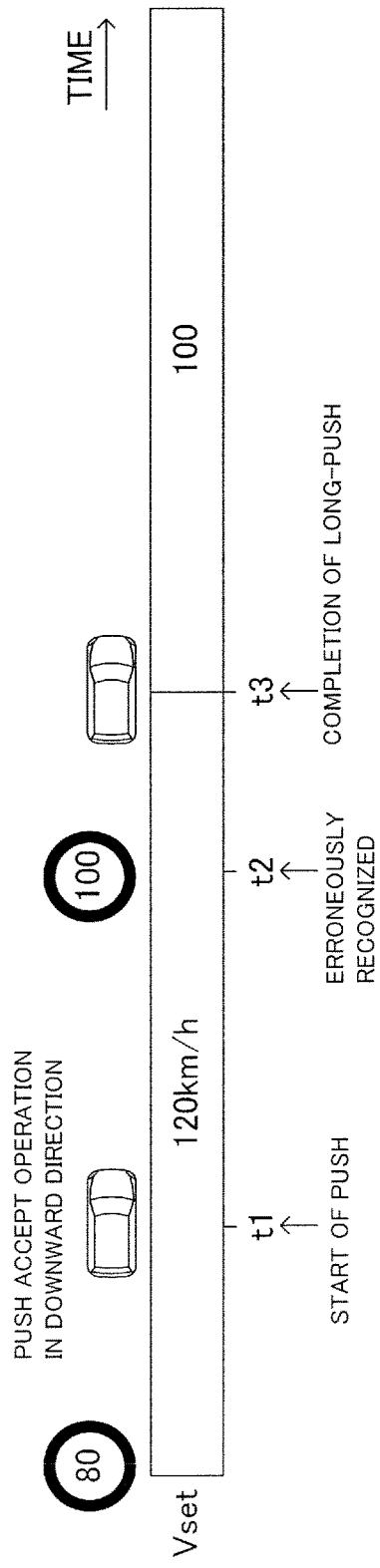
FIG. 13B is a diagram illustrating the change of the target speed in a modified example when the accept operation is performed.

For example, as illustrated in FIG. 13B, a situation is considered in which the target speed Vset is 120 km/h, the first speed limit Vlim1 is 80 km/h, and the second speed limit Vlim2 is 100 km/h. In this situation, when the downward accept operation of the cruise operating unit 70 has been detected, the driving support ECU 10 changes the target speed from 120 km/h to 100 km/h. In such a situation, since an amount of operation time and work of the cruise operating unit 70 for correcting the target speed is low, it is possible to prevent the operation burden of the driver from being increased.

<Application to ASL>

The embodiments described as above is the vehicle traveling control apparatus configured to control a driving force and a braking force of the own vehicle so as to keep the own vehicle traveling at a constant speed in accordance with the speed limit. Instead of the embodiments, the present invention may be applicable to a vehicle traveling control apparatus which sets an upper vehicle speed limit that is an upper limit of the vehicle speed based on the speed limit, and controls the driving force and the braking force in such a manner that the vehicle speed does not exceed the upper vehicle speed limit. The vehicle traveling control apparatus in this modified example is a vehicle speed limiting apparatus which is referred to as an "ASL (Adjustable Speed Limiter)". In this modified example, the vehicle traveling control apparatus in FIG. 1 includes a driving support ECU 10' as substitute for the driving support ECU 10, and an ASL operating unit 70' as substitute for the cruise operating unit 70.

The driving support ECU 10' is connected to the ASL operating unit 70'. The ASL operating unit 70' includes the similar configuration to the cruise operating unit 70. The resume/speed-increasing switch 73 and the set/speed-reduction switch 74 are used for setting the upper speed limit in place of the target speed. Hereinafter, the upper vehicle speed limit for the ASL is referred to as an "upper limit for ASL". In addition, the speed limit recognized by the speed limit acquisition ECU 20 is referred to as a "speed limit". The resume/speed-increasing switch 73 and the set/speed-reduction switch 74 are used to set the upper limit for ASL in the same manner as they are used to set the target speed in the above embodiments. Accordingly, the function of the ASL operating unit 70' can be understood by replacing the "target speed" in the description of the embodiments with the "upper limit for ASL", and thus, detailed descriptions of the unit 70' will be omitted. In this modified example, the mode switch 76 is not necessary.

For example, the tap-down operation (the downward short-push operation) of the ASL operating unit 70' functions to reduce the upper limit for ASL by a predetermined speed (for example, 1 km/h). The tap-up operation (the upward short-push operation) of the ASL operating unit 70' functions to increase the upper limit for ASL by a predetermined speed (for example, 1 km/h). Further, the coast operation (the downward long-push operation) of the ASL operating unit 70' functions to gradually reduce the upper limit for ASL at a predetermined speed interval (for example, 5 km/h). The acceleration operation (the upward long-push operation) of the ASL operating unit 70' functions to gradually increase the upper limit for ASL at a predetermined speed interval (for example, 5 km/h). In addition, the definitions of the "long-push operation" and the "short-push operation" are the same as those of the above-described embodiment.

The driving support ECU 10' is an electronic control unit that determines the upper limit for ASL which is the upper limit of the running speed of the vehicle based on the speed limit output from the speed limit detection ECU 20 and a switch signal output from the ASL operating unit 70'. When the main switch 72 of the ASL operating unit 70' is in the ON state, the driving support ECU 10' executes the vehicle speed limiting control. On the other hand, when the main switch 72 of the ASL operating unit 70' is in the OFF state, the driving support ECU 10' does not execute the vehicle speed limiting control. In addition, the vehicle speed limiting control itself is performed by the engine ECU 30. Therefore, the driving support ECU 10' transmits to the engine ECU 30 information on the upper limit for ASL used for the vehicle speed limiting control to thereby have the engine ECU 30 execute the vehicle speed limiting control.

While the driving support ECU 10' transmits the upper limit for ASL to the engine ECU 30 every time a predetermined cycle elapses, the engine ECU 30 controls the driving force of the engine 31 in such a manner that the vehicle speed of the own vehicle does not exceed the upper limit for ASL. That is, the engine ECU 30 executes the vehicle speed limiting control. The engine ECU 30 calculates the driving force required by the driver based on the vehicle speed (referred to as an "actual vehicle speed") detected by a vehicle speed sensor (one of the sensors 33) and an accelerator pedal operation amount detected by an accelerator pedal sensor (one of the sensors 33). Then, the engine ECU 30 controls the engine 31 and the transmission 32 so as to generate the required driving force. In this case, when it is predicted that the actual vehicle speed exceeds the upper limit for ASL, the engine ECU 30 decreases the opening degree of a throttle valve that adjusts an intake air amount of the engine 31, or limits a fuel injection amount to the engine 31, or adjusts the gear ratio of the transmission 32, in such a manner that the actual vehicle speed does not exceed the upper limit for ASL. Further, when the required driving force has a value requiring a large braking force, and the engine 31 and the transmission 32 alone cannot satisfy the required driving force, the engine ECU 30 transmits information on the required braking force to the brake ECU 40 so as to compensate for the shortage by a hydraulic brake.

The ASL operating unit 70' is used not only for increasing/decreasing the upper limit for ASL, but also as an operating apparatus for permitting the driver to set the upper limit for ASL to the speed limit. When the ASL operating unit 70' is operated so as to authorize the driving support ECU 10' to set the upper limit for ASL to the speed limit, the driving support ECU 10' sets the speed limit recognized by the speed limit detection ECU 20 as the upper limit for ASL.

When the main switch 72 is in the ON state, the driving support ECU 10' executes a display control routine, and an ASL upper limit setting routine. The display control routine in this example includes processes similar to the processes of the display control routine described above (FIG. 4) in which the "target speed" is replaced with the "upper limit for ASL", the "display value Vsetd for gradual-change target speed" is replaced with the "display value for gradual-change of the upper limit for ASL", and the "cruise operating unit" is replaced with the "ASL operating unit". Further, the ASL upper limit setting routine in this example includes processes similar to the processes of the target speed setting routine described above (FIG. 6 or 11) in which the "target speed" is replaced with the "upper limit for ASL", the "display value Vsetd for gradual-change target speed" is replaced with the "display value for gradual-change of the upper limit for ASL", and the "cruise operating unit" is replaced with the "ASL operating unit". Therefore, detailed descriptions are omitted.

Similarly, the above-described modifications can be applied to the setting of the upper limit for ASL.

According to the vehicle traveling control apparatus including ASL (Adjustable Speed Limiter), when the detected speed limit is set as the upper limit for ASL, the upper limit for ASL is gradually changed toward the detected speed limit. Therefore, if the speed limit is erroneously recognized, an amount of operation time and work of the ASL operating unit 70' for correcting the upper limit for ASL is low. As a result, the apparatus which is convenient for the driver can be provided. Further, it is possible to correct in a short time a situation in which the running speed of the own vehicle exceeds the speed limit against the intention of the driver.

<Other Modifications>

In the present embodiments, the cruise operating unit 70 serves as both an operating unit for performing the accept operation and an operating unit for increasing or decreasing the target speed. However, it is not necessarily required that the cruise operating unit 70 serves as both of the above-described two operating units. For example, an operating part separately including the operating unit for performing the accept operation and the operating unit for increasing or decreasing the target speed may be provided in a position (the steering handle, etc.) which can be operated by the driver.

In the present embodiments, the accept operation is the long-push operation. However, it is not necessarily required that the accept operation is the long-push operation, and therefore, the accept operation may be the short-push operation. In the present embodiments, the accept directions include the upward direction and the downward direction, but it is not limited to such directions. For example, the accept directions may be other directions such as a left direction and a right direction viewed from the driver, or a front direction and a backward direction viewed from the driver. Further, it is not necessarily required that the accept direction is separated in two directions, namely, the accept direction may be only one direction.

Further, in the present embodiments, a lever type of the operating unit 70(70') is adopted. However, it is not necessarily required that the operating unit is a lever type. A button type, a sliding type, or other types of unit may be adopted.

What is claimed is:

1. A vehicle traveling control apparatus comprising:
an operating unit which is operated by a driver; and
a processor programmed to:
execute a constant speed control for keeping an own vehicle traveling at a constant speed equal to a target speed without an accelerator pedal operation by the driver,
detect a speed limit of a road on which the own vehicle travels,
display the target speed and the detected speed limit on a display apparatus,
when a permission operation which is an operation of the operating unit for permitting the detected speed limit to be set as the target speed is detected, set the target speed to the detected speed limit,
when an adjustment operation which is an operation of the operating unit for increasing or decreasing the target speed is detected, increase or decrease the target speed in response to an amount of the adjustment operation,
display a first display value as the target speed displayed on the display apparatus and gradually change the first display value from the current target speed toward the detected speed limit, when the permission operation has been detected, and
display, in place of the first display value, a second display value which is a value adjusted with respect to a final value of the first display value in response to an amount of the adjustment operation of the operating unit, when the adjustment operation has been detected while the first display value is being changed toward the detected speed limit.

2. The vehicle traveling control apparatus according to claim 1, wherein,
the processor is further programmed to gradually change the target speed from the current target speed toward the detected speed limit in accordance with the change of the first display value, when the permission operation has been detected.

3. The vehicle traveling control apparatus according to claim 1, wherein,
the processor is further programmed to set the target speed to the detected speed limit irrespective of the first display value, when the permission operation has been detected.

4. The vehicle traveling control apparatus according to claim 1, wherein,
the processor is further programmed to set the target speed to the second display value, when the second display value is displayed on the display apparatus.

5. The vehicle traveling control apparatus according to claim 1, wherein
the operating unit is configured to function as both an operating unit for performing the permission operation and an operating unit for performing the adjustment operation, and
the processor is further programmed to detect, as the permission operation, a push operation, which is an operation in a direction for bringing the target speed closer to the detected speed limit in a case where the operating unit is used as the operating unit for performing the adjustment operation, and which is a long-push operation in which a duration time of the push operation continues for a predetermined long-push completion time or more.

6. A vehicle traveling control apparatus comprising:
an operating unit which is operated by a driver; and
a processor programmed to:
control a driving force and a braking force of an own vehicle such that a vehicle speed of the own vehicle does not exceed an upper speed limit,
detect a speed limit of a road on which the own vehicle travels,
display the upper speed limit and the detected speed limit on a display apparatus,
when a permission operation which is an operation of the operating unit for permitting the detected speed limit to be set as the upper speed limit is detected, setting the upper speed limit to the detected speed limit,
when an adjustment operation which is an operation of the operating unit for increasing or decreasing the upper speed limit is detected, increasing or decreasing the upper speed limit in response to an amount of the adjustment operation,
display a first display value as the upper speed limit displayed on the display apparatus and gradually change the first display value from the current upper speed limit toward the detected speed limit, when the permission operation has been detected, and
end the display of the first display value, and display a second display value which is a value adjusted with respect to a final value of the first display value in response to an amount of the adjustment operation, when the adjustment operation has been detected while the first display value is being changed toward the detected speed limit.

* * * * *